(12) United States Patent
Takubo et al.

(10) Patent No.: US 7,432,971 B2
(45) Date of Patent: Oct. 7, 2008

(54) IN-SITU STORAGE IMAGE SENSOR AND IN-SITU STORAGE IMAGE PICKUP APPARATUS

(75) Inventors: Kenji Takubo, Kyoto (JP); Yasushi Kondo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 926 days.

(21) Appl. No.: 10/455,551

(22) Filed: Jun. 6, 2003

(65) Prior Publication Data
US 2003/0234874 A1 Dec. 25, 2003

(30) Foreign Application Priority Data
Jun. 21, 2002 (JP) .............................. 2002-181286

(51) Int. Cl.
*H04N 3/14* (2006.01)
*H04N 5/335* (2006.01)
(52) U.S. Cl. ...................................... 348/317; 348/318
(58) Field of Classification Search ................. 348/317, 348/318
See application file for complete search history.

(56) References Cited

U.S. PATENT DOCUMENTS

| 4,897,728 A | * | 1/1990 | Yamada ....................... 348/318 |
| 4,996,600 A | * | 2/1991 | Nishida et al. ............... 348/322 |
| 5,287,183 A | * | 2/1994 | Thomas et al. ............... 348/571 |
| 6,157,408 A | * | 12/2000 | Etoh .......................... 348/316 |
| 6,541,805 B1 | * | 4/2003 | Suzuki ........................ 257/232 |
| 6,972,795 B1 | * | 12/2005 | Etoh et al. ................... 348/311 |
| 2003/0089908 A1 | * | 5/2003 | Mutoh et al. .................. 257/59 |

* cited by examiner

*Primary Examiner*—James M Hannett
(74) *Attorney, Agent, or Firm*—Cheng Law Group PLLC

(57) ABSTRACT

A plurality of storage pixels within each unit pixel are arranged successively so that signal electrons for each storage pixel are moved independently through the storage pixels. Signal electrons newly generated in a photosensitive pixel are added to relevant signal electrons among the signal electrons moved independently through the storage pixels. That is, signal electrons generated in the photosensitive pixel for each of highly relevant frames are superimposed in the same storage pixel and stored in each storage pixel. The signal electrons stored in each storage pixel are subsequently amplified in and outputted from an output amplifier only once. Thus, read noise occurs only once at the output amplifier, to obtain images of high signal-to-noise ratio.

20 Claims, 14 Drawing Sheets

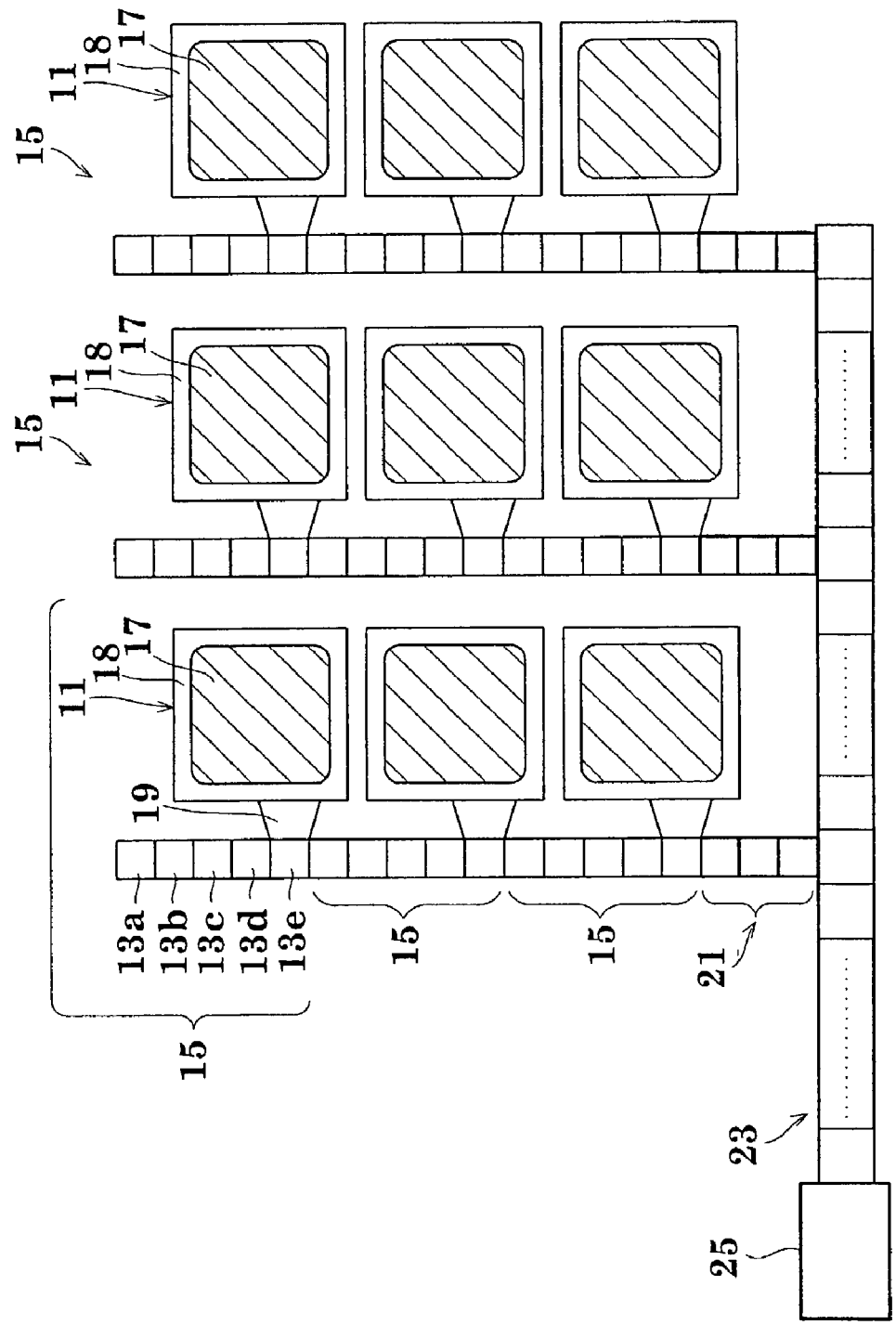

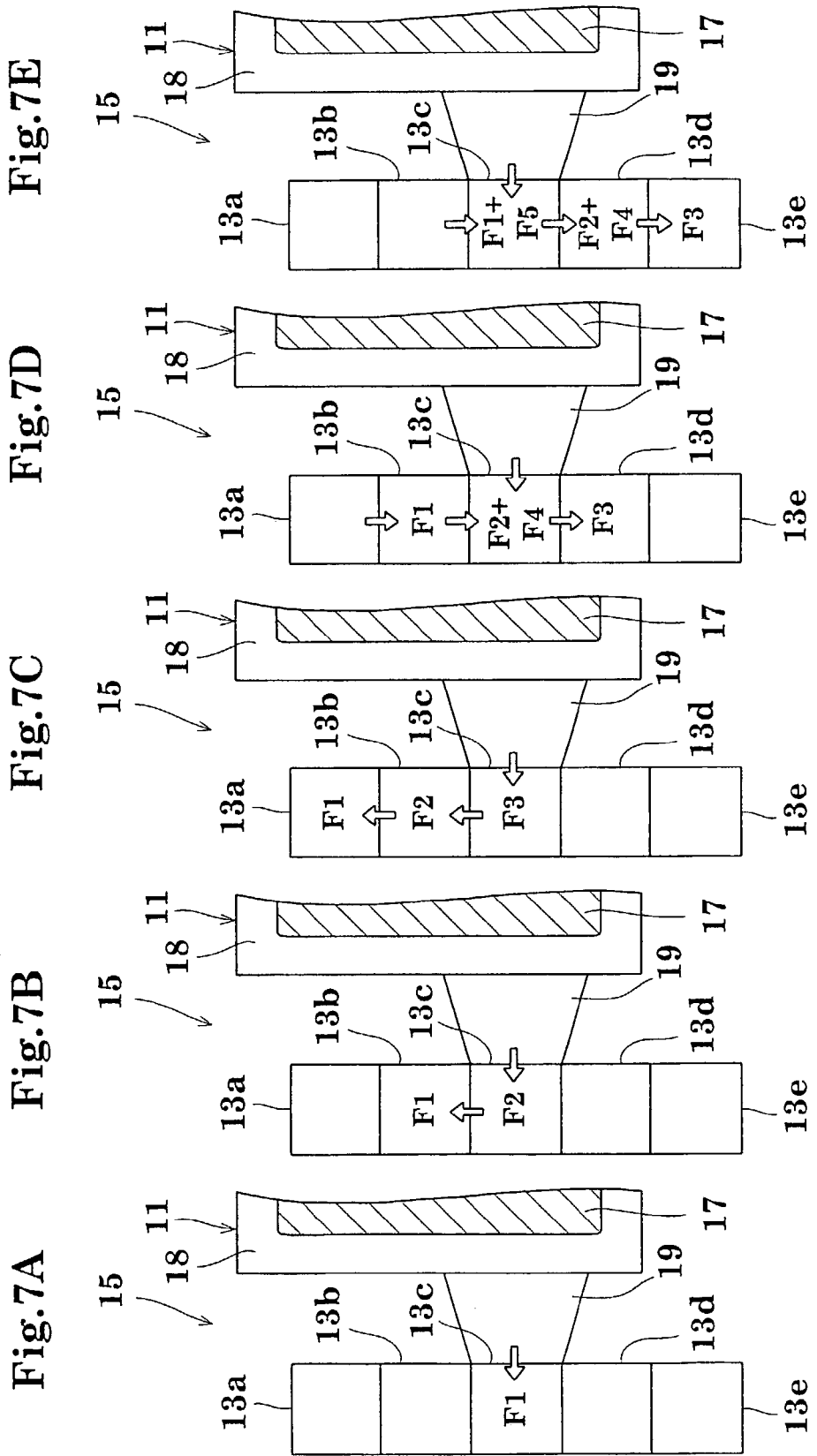

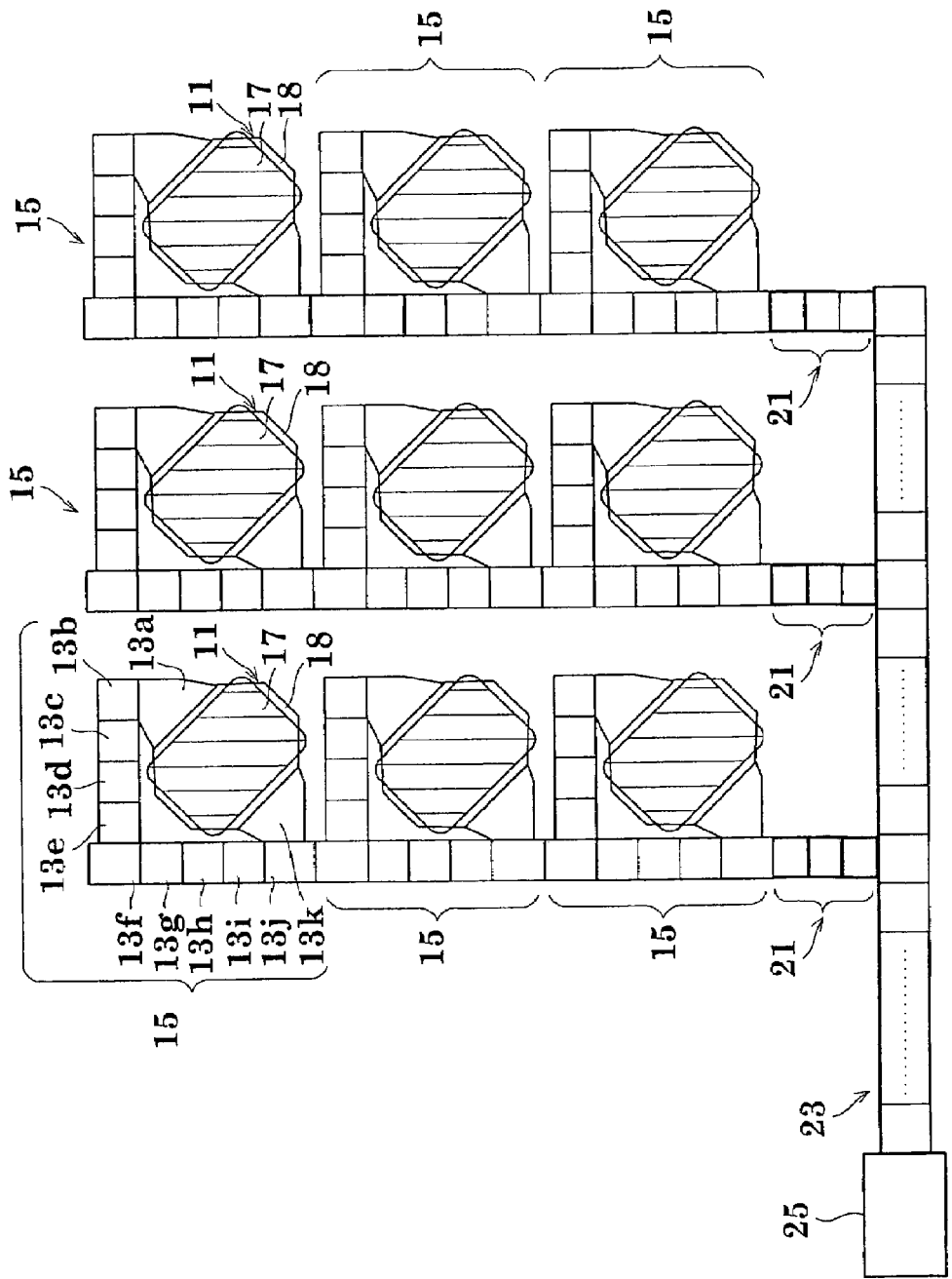

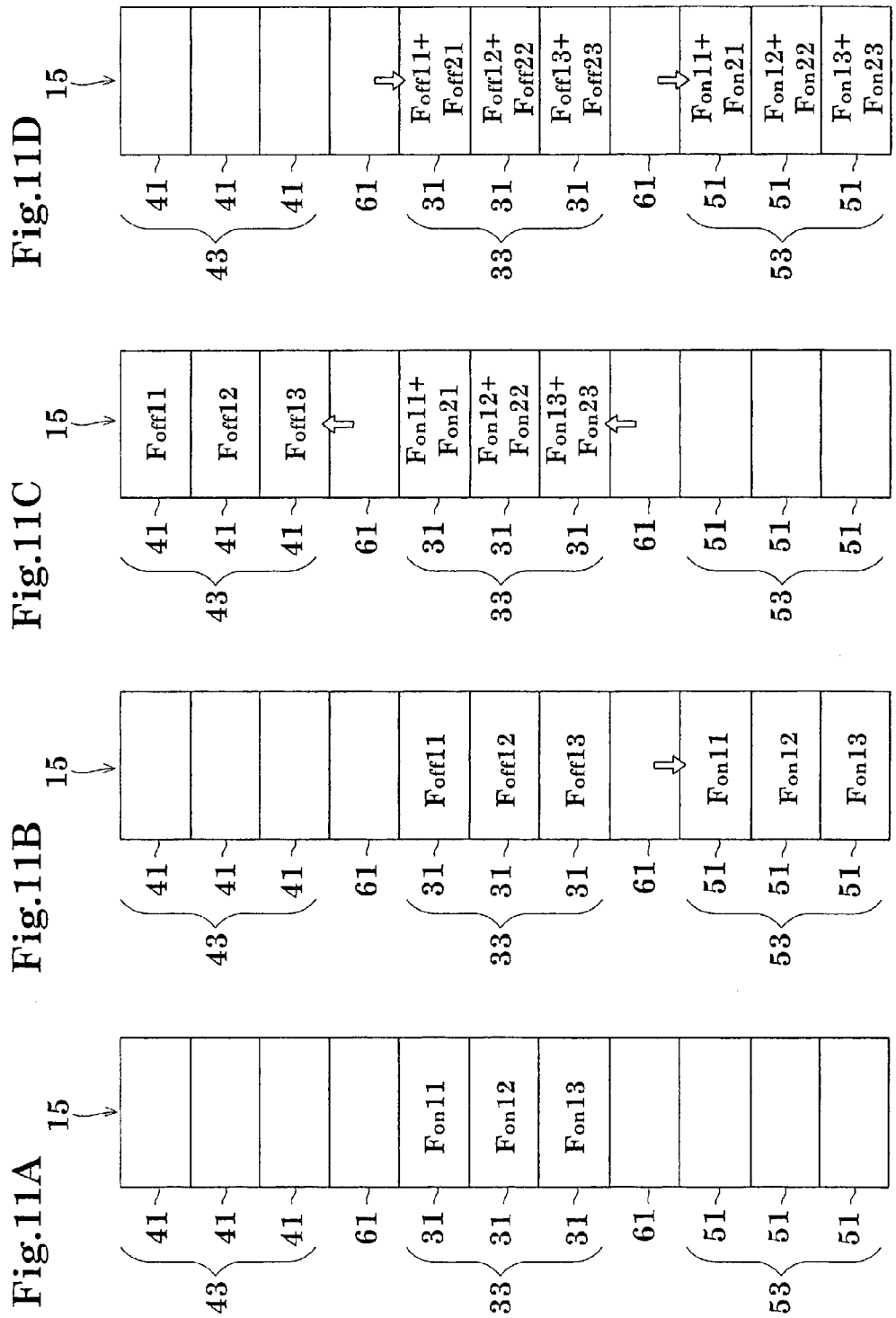

IN-SITU STORAGE IMAGE SENSOR AND IN-SITU STORAGE IMAGE PICKUP APPARATUS

BACKGROUND OF THE INVENTION (1) Field of the Invention

This invention relates to an image sensor and an image pickup apparatus such as an in-situ storage image sensor for performing high-speed photography, for example. More particularly, the invention relates to a technique for obtaining images of high signal-to-noise ratio in time of high-speed photography.

(2) Description of the Related Art

Conventional image pickup apparatus include a video camera (ultra high-speed video camera) which realizes a high-speed photography of 1 million frames per second, for example. This image pickup apparatus realizes high-speed photography with an image sensor called "in-situ storage image sensor" to be described hereinafter. The in-situ storage image sensor has a plurality of unit pixels including photosensitive pixels for performing a photoelectric conversion of incident light, and storage pixels for storing, on a frame-by-frame basis, signal electrons generated in the photosensitive pixels for a plurality of frames (images) photographed at different times. This image sensor outputs the signal electrons from the respective storage pixels after high-speed photography. Thus, after storing and recording a plurality of frames as classified in the image sensor, the plurality of recorded frames are read from the image sensor. In this way, a continuous image recording may be carried out at high speed without limitations imposed by read time.

Exposure time is shorter in high-speed photography (e.g. 1 million frames per second) than in ordinary photography. Thus, it often is the case that a sufficient quantity of light cannot be secured for high-speed photography because of the performance of an illuminating device used in the high-speed photography, and the need to avoid heating of a photographic subject due to illumination light.

Phenomena taken as objects of high-speed photography often are repetitive phenomena. Such repetitive phenomena are varied and include, for example, a reciprocating motion of an engine piston and a rotary motion of a rotor in a motor. In observing a repetitive phenomenon, it is well known to improve a signal-to-noise ratio by integrating signals generated at points of time when a motion is in the same phase, i.e. signals (highly relevant signals) generated at points of time when the phenomenon is in the same state. It should be possible to observe images with a high signal-to-noise ratio, even where an illuminating device of low illuminance is used, by applying this principle to high-speed photography and integrating signals of each corresponding phase. FIG. 1 is an explanatory view of an integrating process for a repetitive phenomenon carried out by a conventional image pickup apparatus using the above principle. For expediency of description, FIG. 1 shows only one photosensitive pixel 101, and does not show a plurality of storage pixels provided for this photosensitive pixel 101. As shown in FIG. 1, the conventional image pickup apparatus stores, on a frame-by-frame basis in the plurality of storage pixels, signal electrons generated in the photosensitive pixel 101 for a plurality of frames (images) photographed at different times by high-speed photography. An output amplifier 103 amplifies and outputs the signals (signal electrons) from the storage pixels successively and individually. An analog-to-digital converter 105 converts the analog output electric voltage (or current) signals from the output amplifier 103 to digital signals. A signal integrator 107 integrates digital signals of a corresponding phase i.e. digital signals generated at different points of time when a phenomenon is in the same state, among the digital signals from the analog-to-digital converter 105, and outputs the digital signals as a final output. The conventional image pickup apparatus has no other way but to integrate image signals of each corresponding phase read from the image sensor as noted above.

However, the conventional apparatus constructed as described above has the following drawback.

In the conventional image pickup apparatus, as shown in FIG. 1, signals (signal electrons) of each corresponding phase acquired through a series of observations are read from the image sensor a plurality of times (corresponding to the number of integrating operations). Each time the signals are read, read noise (1/f noise, shot noise, etc.) is superimposed on the signals at the output amplifier 103. This constitutes a problem of lowering the signal-to-noise ratio.

SUMMARY OF THE INVENTION

This invention has been made having regard to the state of the art noted above, and its object is to provide an image sensor and an image pickup apparatus for obtaining images of high signal-to-noise ratio in time of high-speed photography.

The above object is fulfilled, according to this invention, by an image sensor for converting optical images to electric outputs, comprising a plurality of unit pixels each including a photosensitive pixel for performing a photoelectric conversion of incident light, and a plurality of storage pixels for storing, on a frame-by-frame basis, signal electrons generated in the photosensitive pixel for a plurality of frames photographed at different times, the image sensor outputting the signal electrons from the storage pixels after a photographing operation; wherein the storage pixels within each of the unit pixels are arranged successively, or arranged with the photosensitive pixel disposed between certain of the storage pixels, so that the signal electrons for each storage pixel are moved independently through the storage pixels; and signal electrons newly generated in the photosensitive pixel within each of the unit pixels are added, in the unit pixel, to relevant signal electrons among the signal electrons moved independently through the storage pixels within the unit pixel.

With the image sensor according to this invention, each of the unit pixels includes a photosensitive pixel for performing a photoelectric conversion of incident light, and a plurality of storage pixels for storing, on a frame-by-frame basis, signal electrons generated in the photosensitive pixel for a plurality of frames photographed at different times. The image sensor outputs the signal electrons from the storage pixels after a photographing operation. The storage pixels within each unit pixel are arranged successively, or arranged with the photosensitive pixel disposed between certain of the storage pixels, so that the signal electrons for each storage pixel are moved independently through the storage pixels. Signal electrons newly generated in the photosensitive pixel within each unit pixel are added, in the unit pixel, to relevant signal electrons among the signal electrons moved independently through the storage pixels within the unit pixel. Thus, signal electrons generated in the photosensitive pixel for each of highly relevant frames are superimposed in the same storage pixel and stored in each storage pixel. That is, a plurality of highly relevant frames are integrated into one frame within the image sensor, which frame is subsequently amplified in and outputted from an output amplifier. Thus, noise in time of amplification and output, i.e. read noise, occurs only once at the output amplifier, to obtain images of high signal-to-noise ratio.

Preferably, the storage pixels within each of the unit pixels are arranged linearly or annularly in succession, or arranged linearly of annularly with the photosensitive pixel disposed between certain of the storage pixels, so that the signal electrons for each storage pixel are moved independently and cyclically or back and forth through the storage pixels, and the signal electrons newly generated in the photosensitive pixel within each of the unit pixels are added, in the unit pixel, to relevant signal electrons among the signal electrons moved independently and cyclically or back and forth through the storage pixels within the unit pixel. Thus, signal electrons generated in the photosensitive pixel for each of highly relevant frames are superimposed in the same storage pixel and stored in each storage pixel. That is, a plurality of highly relevant frames are integrated into one frame within the image sensor, which frame is subsequently amplified in and outputted from an output amplifier. Thus, noise in time of amplification and output, i.e. read noise, occurs only once at the output amplifier, to obtain images of high signal-to-noise ratio.

Preferably, the image sensor further comprises a transfer device for transferring the signal electrons in a predetermined direction from each of the unit pixels, and a transfer control device for performing a transfer control to add, in the transfer device, the signal electrons from corresponding storage pixels in at least two of the plurality of unit pixels. This construction enables an addition of signal electrons stored in the corresponding storage pixels in a plurality of unit pixels.

Preferably, the transfer device includes a vertical transfer device for vertically transferring the signal electrons from each of the unit pixels, and a horizontal transfer device for horizontally transferring the signal electrons received from the vertical transfer device, and the transfer control device is arranged to perform the transfer control to add, in at least one of the vertical transfer device and the horizontal transfer device, the signal electrons from the corresponding storage pixels in at least two of the plurality of unit pixels. This construction enables an addition of signal electrons stored in the corresponding storage pixels in a plurality of unit pixels.

Each of the unit pixels may include a plurality of photosensitive pixels and a plurality of storage pixels, the plurality of photosensitive pixels being connected to one of the storage pixels. Thus, signal electrons generated in the photosensitive pixels within each unit pixel may be added in the storage pixels within the unit pixel. One of the photosensitive pixels may receive a light of one wavelength, and the other photosensitive pixel a light of a different wavelength. This increases the degree of freedom for various processes of image signals.

In a further aspect of this invention, an image pickup apparatus having an image sensor as described above is provided for photographing a photographic subject, the apparatus comprising a periodic signal creating device for creating a periodic signal concerning a repetitive phenomenon of the photographic subject, a clock signal generating device for generating a clock signal by multiplying the periodic signal from the periodic signal creating device by the number of the storage pixels, and a control device for controlling each of the unit pixels, based on the clock signal from the clock signal generating device, to integrate into the same storage pixel the signal electrons generated each time the repetitive phenomenon is in a corresponding phase.

With the apparatus according to this invention having the image sensor, the periodic signal creating device creates a periodic signal concerning a repetitive phenomenon of the photographic subject, a clock signal generating device generates a clock signal by multiplying the periodic signal from the periodic signal creating device by the number of the storage pixels, and a control device controls each of the unit pixels, based on the clock signal from the clock signal generating device, to integrate into the same storage pixel the signal electrons generated each time the repetitive phenomenon is in a corresponding phase. Thus, signal electrons generated in the photosensitive pixel for each of highly relevant frames are superimposed in the same storage pixel and stored in each storage pixel. That is, a plurality of highly relevant frames are integrated into one frame within the image sensor, which frame is subsequently amplified in and outputted from an output amplifier. Thus, noise in time of amplification and output, i.e. read noise, occurs only once at the output amplifier. This image pickup apparatus can obtain images of high signal-to-noise ratio.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 6 is a schematic view showing a principal portion of an image sensor in a second embodiment;

FIGS. 7A through 7E are views illustrating an integration of signal electrons of a corresponding phase in storage pixels arranged linearly;

FIG. 8 is a schematic view showing a principal portion of an image sensor in a third embodiment;

FIGS. 11A through 11D are views illustrating an integration of signal electrons of a corresponding phase in two storage units and a photosensitive unit;

DESCRIPTION OF THE PREFERRED EMBODIMENTS

Preferred embodiments of this invention will be described in detail hereinafter with reference to the drawings.

First Embodiment

Figure 1:
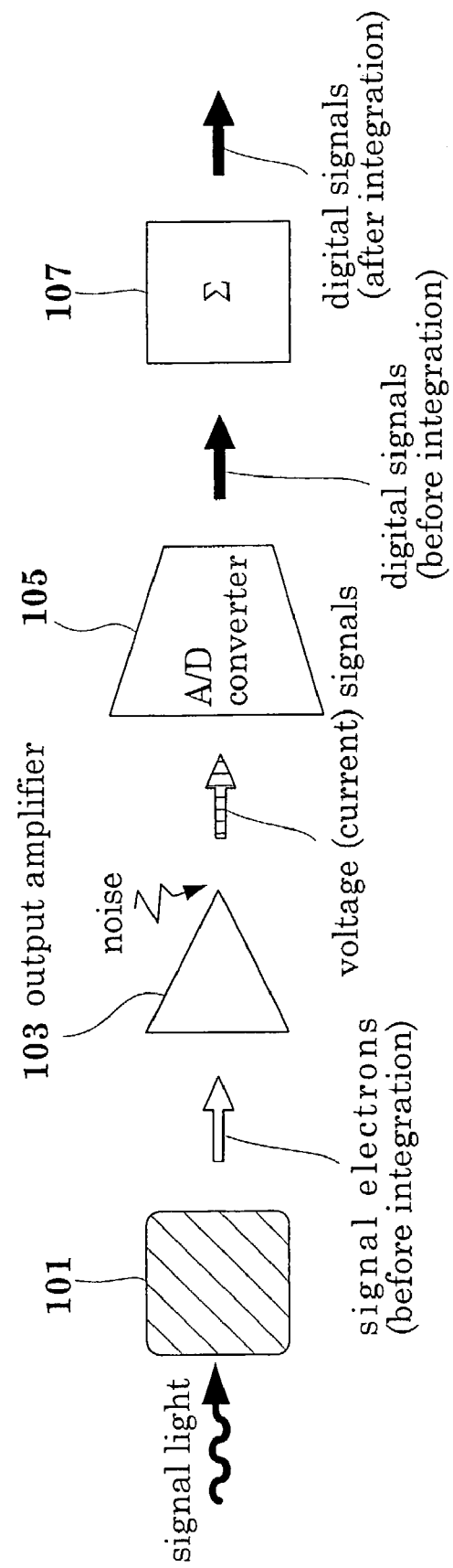
FIG. 1 is an explanatory view showing an integrating process for a repetitive phenomenon by a conventional image pickup apparatus.
Figure 2:
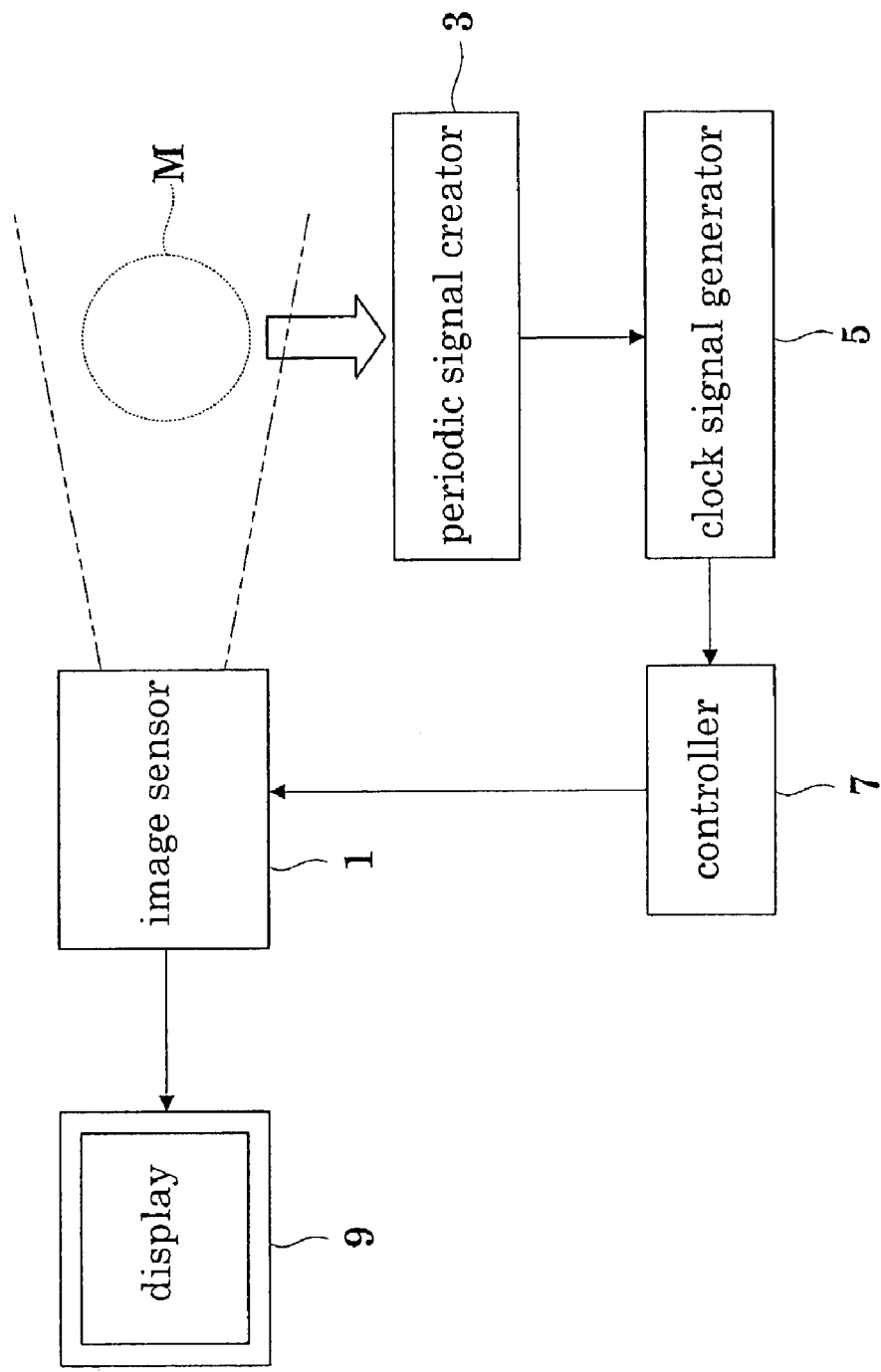
FIG. 2 is a block diagram of an image pickup apparatus in a first embodiment of the invention.
Figure 3:
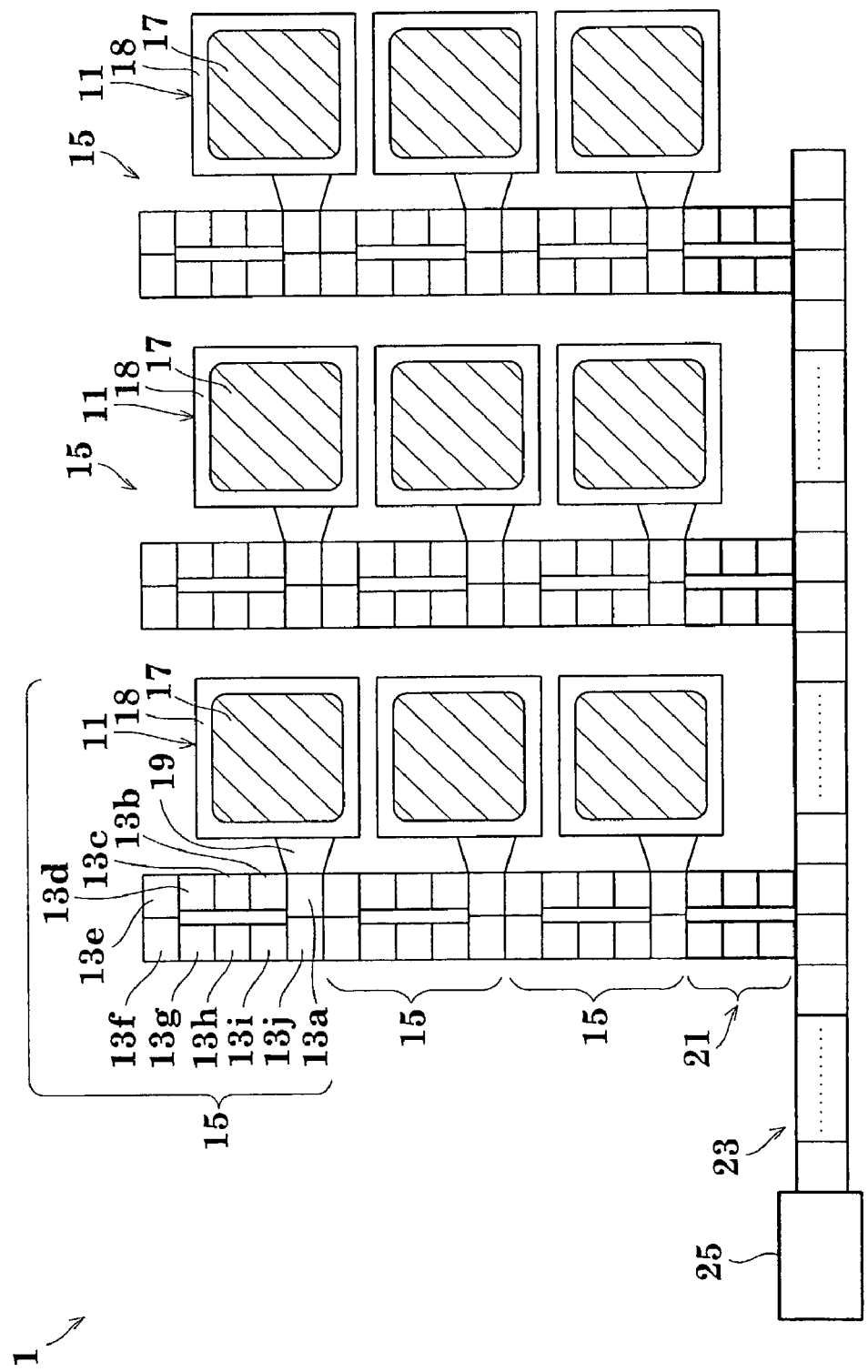
FIG. 3 is a schematic view showing a principal portion of an image sensor in the first embodiment.
Figure 4A:
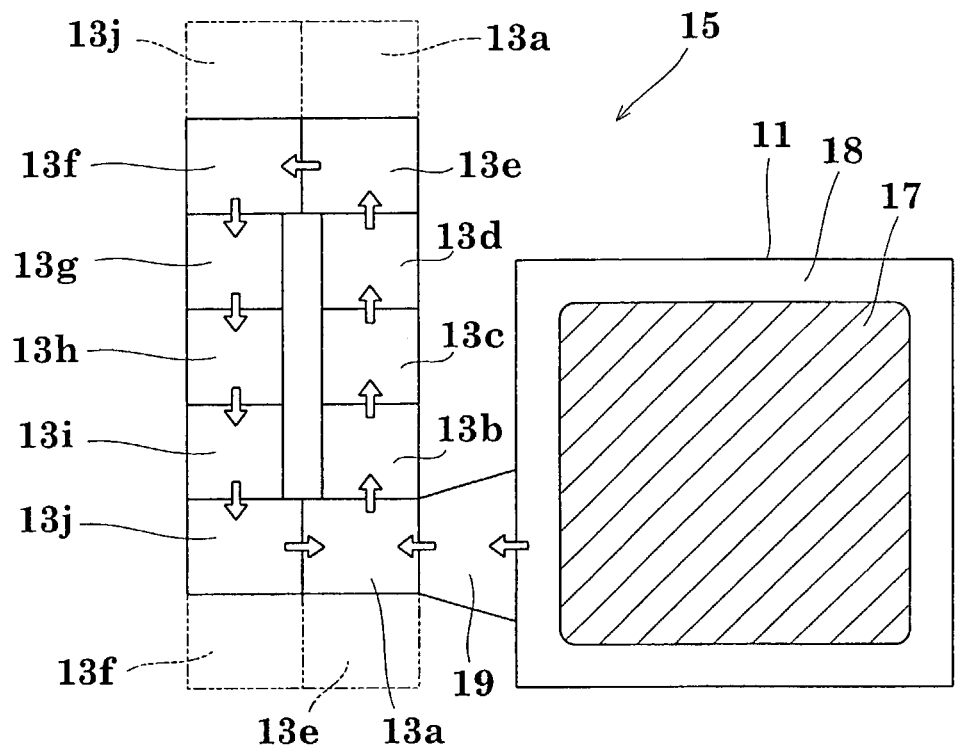
FIG. 4A is a view illustrating an integration of signal electrons of a corresponding phase in storage pixels arranged in a loop.
Figure 4B:
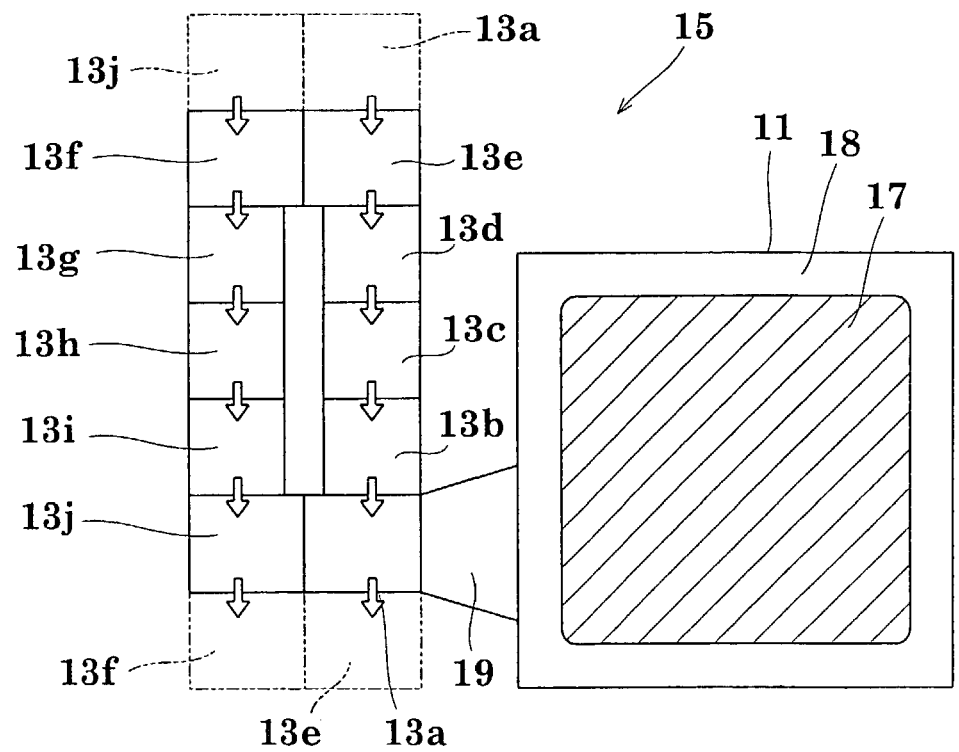
FIG. 4B is a view showing the signal electrons read from the storage pixels shown in FIG. 4A.

FIG. 2 is a block diagram of an image pickup apparatus in a first embodiment of the invention. FIG. 3 is a schematic view showing a principal portion of an image sensor in the first embodiment. FIG. 4A is a view illustrating an integration of signal electrons of a corresponding phase in storage pixels arranged in a loop. FIG. 4B is a view showing the signal electrons read from the storage pixels shown in FIG. 4A.

As shown in FIG. 2, the image pickup apparatus in the first embodiment includes an image sensor 1 for performing a high-speed photography of a photographic subject M. As shown in FIG. 3, the image sensor 1 includes a plurality of unit pixels 15. Each unit pixel 15 includes a photosensitive pixel 11 for performing a photoelectric conversion of incident light, and a plurality of (e.g. 10) storage pixels 13a-13j for storing, on a frame-by-frame basis, signal electrons generated in the photosensitive pixel 11 for a plurality of (e.g. N, which is assumed to be 10 for expediency of description) frames photographed at different times. After photography, the image sensor 1 outputs the signal electrons from the storage pixels 13a-13j. The image sensor 1 may be said a type of in-situ storage image sensor. For expediency of description, FIG. 3 shows nine unit pixels 15, and storage pixels in each unit pixel 15 as ten storage pixels 13a-13j.

As shown in FIG. 3, each photosensitive pixel 11 has an opening 17 formed centrally of a shielding film 18 covering peripheral edges thereof. Light enters the photosensitive pixel 11 through the opening 17. Pixels and the like (i.e. storage pixels 13a-13j, transfer pixels 19, vertical transfer paths 21, horizontal transfer path 23 and output amplifier 25), excluding the photosensitive pixels 11, are shielded to avoid incidence of light that would become noise. A transfer pixel 19 is connected to each photosensitive pixel 11 for transferring the signal electrons generated in the photosensitive pixel 11 to the storage pixel 13a. The storage pixels 13a-13j in each unit pixel 15 are interconnected and arranged in a loop (i.e. arranged annularly), so that the signal electrons for the respective storage pixels 13a-13j move independently through the storage pixels 13a-13j.

If the opening 17 in the shielding film 18 were enlarged to extend over the entire photosensitive pixel 11, part of the light entering the photosensitive pixel 11 through the opening 17 would travel around and directly enter the transfer pixel 19. Thus, the peripheral edges of the photosensitive pixel 11 are covered by the shielding film 18 to prevent the incident light traveling around to the transfer pixel 19.

As shown in FIG. 3, the image sensor 1 includes vertical transfer paths 21 for vertically transferring the signal electrons stored in the unit pixels 15, a horizontal transfer path 23 for horizontally transferring the signal electrons transferred through the vertical transfer paths 21, and an output amplifier 25 for amplifying and outputting the signal electrons received from the horizontal transfer path 23. The signal electrons are transferred separately not to be mixed in the vertical transfer paths 21, horizontal transfer path 23 or output amplifier 25.

The vertical transfer paths 21 noted above correspond to the transfer device and vertical transfer device of this invention. The horizontal transfer path 23 corresponds to the transfer device and horizontal transfer device of this invention. The output amplifier 25 corresponds to the amplifying and output device of this invention.

As shown in FIG. 2, the image pickup apparatus in the first embodiment further includes a periodic signal creator 3 for creating a periodic signal concerning a repetitive phenomenon of the photographic subject M, a clock signal generator 5 for generating a clock signal by multiplying the periodic signal from the periodic signal creator 3 by the number (N) of storage pixels 13a-13j, a controller 7 for controlling each unit pixel 15, based on the clock signal from the clock signal generator 5, to integrate into the same storage pixel the signal electrons generated each time the repetitive phenomenon is in the corresponding phase, and a display 9 for displaying a plurality of (N) frames read from the image sensor 1.

The periodic signal creator 3 noted above corresponds to the periodic signal creating device of this invention. The clock signal generator 5 corresponds to the clock signal generating device of this invention. The controller 7 corresponds to the control device of this invention.

An operation of the image pickup apparatus having the above construction to photograph the repetitive phenomenon of the photographic subject M will be described next. The image sensor 1 photographs the repetitive phenomenon of the photographic subject M a predetermined number of times. The image sensor 1 photographs each cycle of the repetitive phenomenon of the photographic subject M as divided into N frames (which are assumed to be 10 frames for expediency of description), and stores these ten frames separately in the ten storage pixels 13a-13j.

In time of photography, the controller 7 drives the ten storage pixels 13a-13j based on the clock signal obtained from the clock signal generator 5 by multiplying, by N (10 in this example), the periodic signal of the repetitive phenomenon of the photographic subject M generated by the periodic signal creator 3. Where, for example, the repetitive phenomenon of the photographic subject M is a rotary motion of a motor armature, the clock signal may be derived from a motor control signal or motor rotation output signal. That is, as shown in FIG. 4A, the storage pixels 13a-13j are empty when the photography is started, and signal electrons are sent frame by frame from the photosensitive pixel 11 to the storage pixels 13a-13j after the photography is started. The signal electrons for N phases (i.e. 10 phases) (signal electrons for 10 frames) corresponding to each cycle of the repetitive phenomenon divided by N (=10) are stored separately in the ten storage pixels 13a-13j.

Specifically, signal electrons for a frame F1 generated at time $t_{11}$ in a first cycle are stored in the storage pixel 13a. Signal electrons are not yet stored in the storage pixels 13b-13j following this storage pixel 13a. At a next time $t_{12}$ in the same cycle, the signal electrons in the storage pixel 13a are moved to and stored in the next storage pixel 13b, and signal electrons for a frame F2 generated at this time $t_{12}$ are stored in the storage pixel 13a. At a next time $t_{13}$ in the same cycle, the signal electrons in the storage pixel 13a are moved to and stored in the next storage pixel 13b, while the signal electrons in the storage pixel 13b are moved to and stored in the next storage pixel 13c, and further signal electrons for a frame F3 generated at this time $t_{13}$ are stored in the storage pixel 13a. In this way, the signal electrons are stored frame by frame in the storage pixels 13a-13j. Signal electrons for each phase pass, in the same cycle as the repetitive phenomenon, through the particular storage pixel 13a connected to the transfer pixel 19 continuous from the photosensitive pixel 11. Thus, signal electrons for a corresponding phase newly sent from the photosensitive pixel 11 are successively integrated in this particular storage pixel 13a. That is, at time $t_{21}$ in the next cycle (second cycle), the signal electrons for the frame F1 generated at time $t_{11}$ in the preceding cycle (first cycle) have returned to and stored in the storage pixel 13a, and in addition the signal electrons for the frame F1 generated at time $t_{21}$ are transferred to the storage pixel 13a from the photosensitive pixel 11. The signal electrons for the frame F1 generated at time $t_{11}$ in the first cycle and the signal electrons for the frame F1 generated at time $t_{21}$ in the second cycle are integrated in this storage pixel 13a.

The photographic operation is completed after photographing the repetitive phenomenon of the photographic subject M a predetermined number of times. As a result, each of the ten storage pixels 13a-13j has, stored therein, an integration of signal electrons generated at different times corresponding the same phase. Subsequently, as shown in FIG. 4B, the signal electrons for ten frames stored in the ten storage pixels 13a-13j of each unit pixel 15 are appropriately sent out to the vertical transfer path 21. The electrons are read through the vertical transfer path 21, horizontal transfer path 23 and output amplifier 25, and are converted by an analog-to-digital converter 27 described hereinafter, to digital signals as a final output.

The step of arranging the plurality of storage pixels 13a-13j successively in each unit pixel 15 so that the signal electrons of each of the storage pixels 13a-13j move independently through the storage pixels 13a-13j corresponds to the arranging step of this invention. The step of controlling each unit pixel 15, based on the periodic signal concerning the repetitive phenomenon of the photographic subject M, to integrate in the same storage pixel 13a the signal electrons generated at different times when the repetitive phenomenon is in a corresponding phase corresponds to the integration controlling step of this invention.

As described above, the image sensor 1 in the first embodiment has the plurality of storage pixels 13a-13j arranged successively in each unit pixel 15 so that the signal electrons of each of the storage pixels 13a-13j are moved independently through the storage pixels 13a-13j. Signal electrons newly generated in the photosensitive pixel 11 in each unit pixel 15 are added to the signal electrons relating to these new signal electrons among the signal electrons moved independently through the plurality of storage pixels 13a-13j in that unit pixel 15. Consequently, signal electrons generated in the photosensitive pixel 11 for a plurality of highly relevant frames (i.e. frames of different times but corresponding to the same state of the phenomenon) are superimposed in the same storage pixel 13a and stored in the respective storage pixels 13a-13j. That is, a plurality of highly relevant frames are integrated into one frame within the image sensor 1, and then amplified and outputted by the output amplifier 25. Thus, noise in time of amplification and output by the output amplifier 25, i.e. read noise, is produced only once, thereby providing images of high signal-to-noise ratio.

Figure 5:
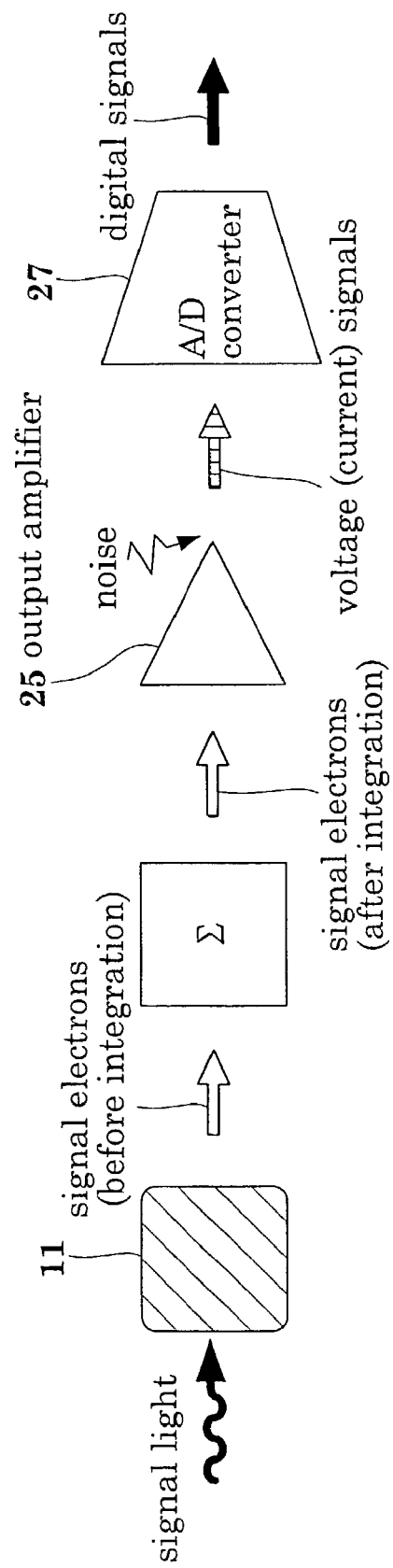
FIG. 5 is an explanatory view showing an integrating process for a repetitive phenomenon carried out by the image pickup apparatus in the first embodiment.

An integrating process for the repetitive phenomenon by the image pickup apparatus in the first embodiment will now be described with reference to FIG. 5. FIG. 5 is an explanatory view showing the integrating process for the repetitive phenomenon carried out by the image pickup apparatus in the first embodiment. For expediency of description, FIG. 5 shows only one photosensitive pixel 11, and does not show the storage pixels 13a-13j, N in number (=10), provided for this photosensitive pixel 11.

As shown in FIG. 5, the image pickup apparatus in the first embodiment stores, on a frame-by-frame basis in the ten storage pixels 13a-13j, signal electrons generated in the photosensitive pixel 11 for a plurality of frames (images) photographed at different times by high-speed photography. The signal electrons for the frames in a corresponding phase (i.e. frames photographed at different times but corresponding to the same state of the phenomenon) are integrated in the storage pixel 13a. "Σ" in FIG. 5 corresponds to the storage pixel 13a. Then, the output amplifier 25 amplifies and outputs the integrated signals (signal electrons) from the storage pixels 13a-13j successively and individually. The analog-to-digital converter 27 converts the analog output electric voltage (or current) signals from the output amplifier 27 to digital signals, and outputs the digital signals as a final output. That is, a plurality of highly relevant frames (i.e. frames in a corresponding phase) are integrated into one frame within the image sensor 1, and then amplified and outputted by the output amplifier 25. Thus, noise in time of amplification and output by the output amplifier 25, i.e. read noise, is produced only once, thereby providing an image of high signal-to-noise ratio.

Further, the image pickup apparatus in the first embodiment includes the image sensor 1 noted above, with the periodic signal creator 3 creating a periodic signal concerning the repetitive phenomenon of the photographic subject M, and the clock signal generator 5 generating a clock signal by multiplying the periodic signal from the periodic signal creator 3 by the number of storage pixels 13a-13j. The controller 7 controls each unit pixel 15, based on the clock signal from the clock signal generator 5, to integrate in the same storage pixel 13a the signal electrons generated each time the repetitive phenomenon is in the corresponding phase. Consequently, signal electrons generated in the photosensitive pixel 11 for a plurality of highly relevant frames (i.e. frames of different times but corresponding to the same state of the phenomenon) are superimposed in the same storage pixel 13a and stored in the respective storage pixels 13a-13j. That is, a plurality of highly relevant frames are integrated into one frame within the image sensor 1, and then amplified and outputted by the output amplifier 25. Thus, noise in time of amplification and output by the output amplifier 25, i.e. read noise, is produced only once, thereby providing images of high signal-to-noise ratio.

Second Embodiment

An image pickup apparatus in a second embodiment of this invention will be described next. FIG. 6 is a schematic view showing a principal portion of an image sensor in the second embodiment. FIGS. 7A through 7E are views illustrating an integration of signal electrons of a corresponding phase in storage pixels arranged linearly. The image pickup apparatus in the second embodiment employs an image sensor having storage pixels 13a-13e in each unit pixel 15 arranged linearly instead of the loop arrangement in the first embodiment. The other aspects are the same as in the first embodiment, and the second embodiment will be described in detail regarding the storage pixels 13a-13e arranged linearly.

As shown in FIG. 6, the second embodiment provides a plurality of (N=5, for example) storage pixels 13a-13e in each unit pixel 15. FIG. 6 shows the five storage pixels 13a-13e by reason of space. To facilitate understanding, the second embodiment will be described with the storage pixels 13a-13e in each unit pixel 15 being five in number. In the second embodiment, signal electrons generated in the photosensitive pixel 11 reciprocate within the arrangement of five storage pixels 13a-13e in each unit pixel 15, in the same cycle as the repetitive phenomenon of the photographic subject M. That is, the signal electrons are passed upward in order within the arrangement of five storage pixels 13a-13e in the unit pixel 15 in a half cycle of the repetitive phenomenon, and then turned back and passed downward in order in a second half cycle.

Specifically, as shown in FIG. 7A, signal electrons for a frame F1 generated at time $t_{11}$ in a first cycle are stored in the storage pixel 13c. Signal electrons are not yet stored in the other storage pixels 13a, 13b, 13d or 13e than this storage pixel 13c. At a next time $t_{12}$ in the same cycle, as shown in FIG. 7B, the signal electrons in the storage pixel 13c are moved to and stored in the next upper storage pixel 13b, and signal electrons for a frame F2 generated at this time $t_{12}$ are stored in the storage pixel 13c. At a next time $t_{13}$ in the same cycle, as shown in FIG. 7C, the signal electrons in the storage pixel 13b are moved to and stored in the next upper storage pixel 13a, while the signal electrons in the storage pixel 13c are moved to and stored in the next upper storage pixel 13b, and further signal electrons for a frame F3 generated at this time $t_{13}$ are stored in the storage pixel 13c.

At a next time $t_{14}$ in the same cycle, as shown in FIG. 7D, the moving direction of the signal electrons in the storage pixels 13a-13c is changed downward. Thus, the signal electrons in the storage pixel 13a are moved to and stored in the next lower storage pixel 13b. The signal electrons in the storage pixel 13b are moved to and stored in the next lower storage pixel 13c. The signal electrons in the storage pixel 13c are moved to and stored in the next lower storage pixel 13d. Further, signal electrons for a frame F4 generated at this time $t_{13}$ are stored and integrated in the storage pixel 13c where the signal electrons for the frame F2 are already stored. That is, the signal electrons for the frame F2 and the signal electrons for the frame F4 are integrated. The frame F2 and frame F4 are images in the same phase, i.e. images obtained when the phenomenon is in the same state.

At a next time $t_{15}$ in the same cycle, as shown in FIG. 7E, the signal electrons in the storage pixel 13b are moved to and stored in the next lower storage pixel 13c, the signal electrons in the storage pixel 13c are moved to and stored in the next lower storage pixel 13d, and the signal electrons in the storage pixel 13d are moved to and stored in the next lower storage pixel 13e. Further, signal electrons for a frame F5 generated at this time $t_{15}$ are stored and integrated in the storage pixel 13c where the signal electrons for the frame F1 are already stored. That is, the signal electrons for the frame F1 and the signal electrons for the frame F5 are integrated. The frame F1 and frame F5 are images in the same phase, i.e. images obtained when the phenomenon is in the same state.

As described above, the image sensor 1 in the second embodiment has the plurality of storage pixels 13a-13e arranged linearly in each unit pixel 15 so that the signal electrons of each of the storage pixels 13a-13e are moved independently through the storage pixels 13a-13e. Signal electrons newly generated in the photosensitive pixel 11 in each unit pixel 15 are added to the signal electrons, relating to these new signal electrons, among the signal electrons moved independently through the plurality of storage pixels 13a-13e in that unit pixel 15. Consequently, signal electrons generated in the photosensitive pixel 11 for a plurality of highly relevant frames (i.e. frames of different times but corresponding to the same state of the phenomenon) are superimposed in the same storage pixel 13c and stored in the respective storage pixels 13a-13e. That is, a plurality of highly relevant frames are integrated into one frame within the image sensor 1, and then amplified and outputted by the output amplifier 25. Thus, noise in time of amplification and output by the output amplifier 25, i.e. read noise, is produced only once, thereby providing images of high signal-to-noise ratio. This is effective particularly for a high-speed photography of a reciprocating motion of an object (e.g. a reciprocating motion of an engine piston).

Third Embodiment

Figure 9A:
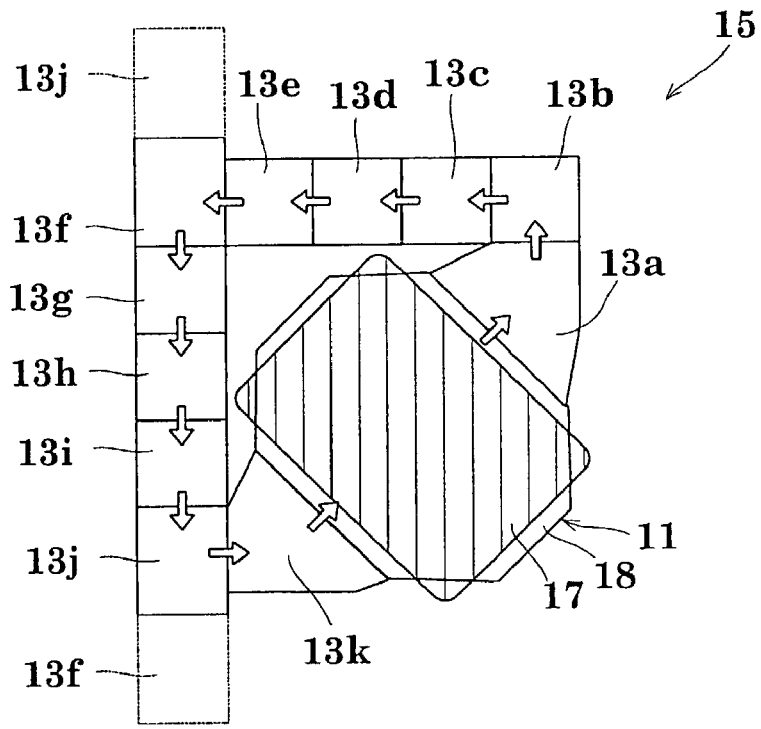
FIG. 9A is a view illustrating an integration of signal electrons of a corresponding phase in a photosensitive pixel incorporated into storage pixels arranged in a loop.
Figure 9B:
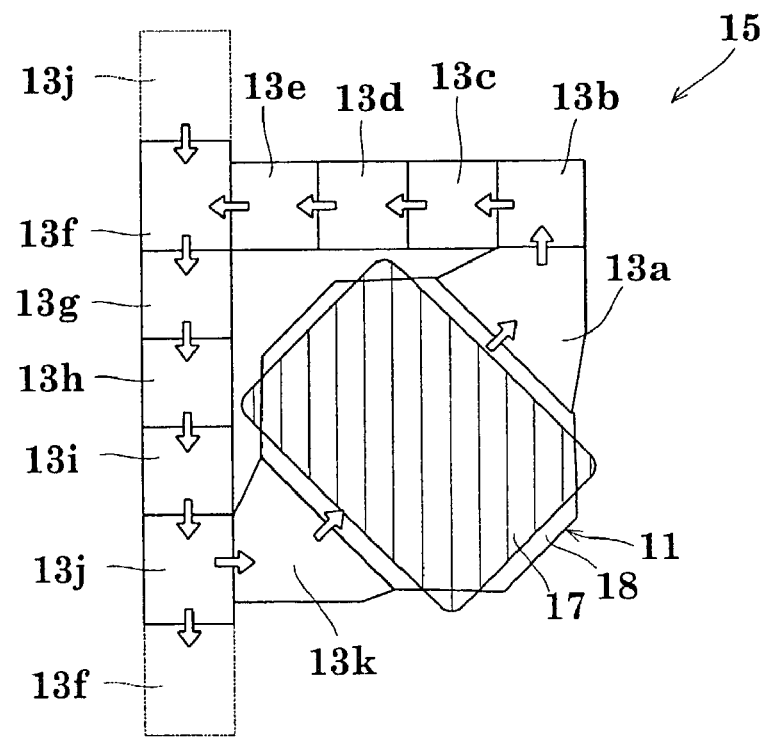
FIG. 9B is a view showing the signal electrons read from the storage pixels shown in FIG. 9A.

An image pickup apparatus in a third embodiment of this invention will be described next. FIG. 8 is a schematic view showing a principal portion of an image sensor in the third embodiment. FIG. 9A is a view illustrating an integration of signal electrons of a corresponding phase in a photosensitive pixel incorporated into storage pixels arranged in a loop. FIG. 9B is a view showing the signal electrons read from the storage pixels shown in FIG. 9A. The image sensor 1 in the first embodiment described hereinbefore has the photosensitive pixel 11 disposed outside the storage pixels 13a-13j arranged in a loop. The third embodiment employs an image sensor 1 having a photosensitive pixel 11 incorporated into storage pixels 13a-13k arranged in a loop. The other aspects are the same as in the first embodiment, and the third embodiment will be described in detail regarding the photosensitive pixel 11 incorporated into storage pixels 13a-13k arranged in a loop.

As shown in FIG. 8, the third embodiment provides a plurality of (N) storage pixels 13a-13k in each unit pixel 15. FIG. 8 shows eleven storage pixels 13a-13k by reason of space. To facilitate understanding, the third embodiment will be described with the storage pixels 13a-13k in each unit pixel 15 being eleven in number. In the third embodiment, signal electrons generated in the photosensitive pixel 11 circulate within the arrangement of the photosensitive pixel 11 and eleven storage pixels 13a-13k in the unit pixel 15, in the same cycle as the repetitive phenomenon of the photographic subject M. That is, signal electrons newly generated in the photosensitive pixel 11 and signal electrons already stored in the storage pixels 13a-13k are added in the photosensitive pixel 11 itself.

Specifically, signal electrons for a frame F1 generated at time $t_{11}$ in a first cycle are stored in the photosensitive pixel 11. Signal electrons are not yet stored in the storage pixels 13a-13k. At a next time $t_{12}$ in the same cycle, the signal electrons in the photosensitive pixel 11 are moved to and stored in the storage pixel 13a, and signal electrons for a frame F2 generated at this time $t_{12}$ are stored in the photosensitive pixel 11. At a next time $t_{13}$ in the same cycle, the signal electrons in the storage pixel 13a are moved to and stored in the next storage pixel 13b, the signal electrons in the photosensitive pixel 11 are moved to and stored in the next storage pixel 13a, and further signal electrons for a frame F3 generated at this time $t_{13}$ are stored in the photosensitive pixel 11. In this way, the signal electrons are stored frame by frame in the photosensitive pixel 11 and storage pixels 13a-13k. Signal electrons for each phase pass through the photosensitive pixel 11 in the same cycle as the repetitive phenomenon. Thus, signal electrons for a corresponding phase newly generated in the photosensitive pixel 11 are successively added in the photosensitive pixel 11 itself. That is, at time $t_{21}$ in the next cycle (second cycle), the signal electrons for the frame F1 generated at time $t_{11}$ in the preceding cycle (first cycle) have returned to and stored in the photosensitive pixel 11, and in addition signal electrons for the frame F1 are generated at time $t_{21}$. The signal electrons for the frame F1 generated at time $t_{11}$ in the first cycle and the signal electrons for the frame F1 generated at time $t_{21}$ in the second cycle are integrated in this photosensitive pixel 11.

The photographic operation is completed after photographing the repetitive phenomenon of the photographic subject M a predetermined number of times. As a result, each of the photosensitive pixel 11 and eleven storage pixels 13a-13k has, stored therein, an integration of signal electrons generated at different times corresponding the same phase. Subsequently, as shown in FIG. 9B, the signal electrons for N frames stored in the photosensitive pixel 11 and eleven storage pixels 13a-13k of each unit pixel 15 are appropriately sent out to the vertical transfer path 21. The electrons are read through the vertical transfer path 21, horizontal transfer path 23 and output amplifier 25, and are converted by the analog-to-digital converter 27 to digital signals as a final output.

As described above, the image pickup apparatus in the third embodiment produces the same effect as the first embodiment. The photosensitive pixel 11 may be fully used as an adding pixel.

Fourth Embodiment

Figure 10:
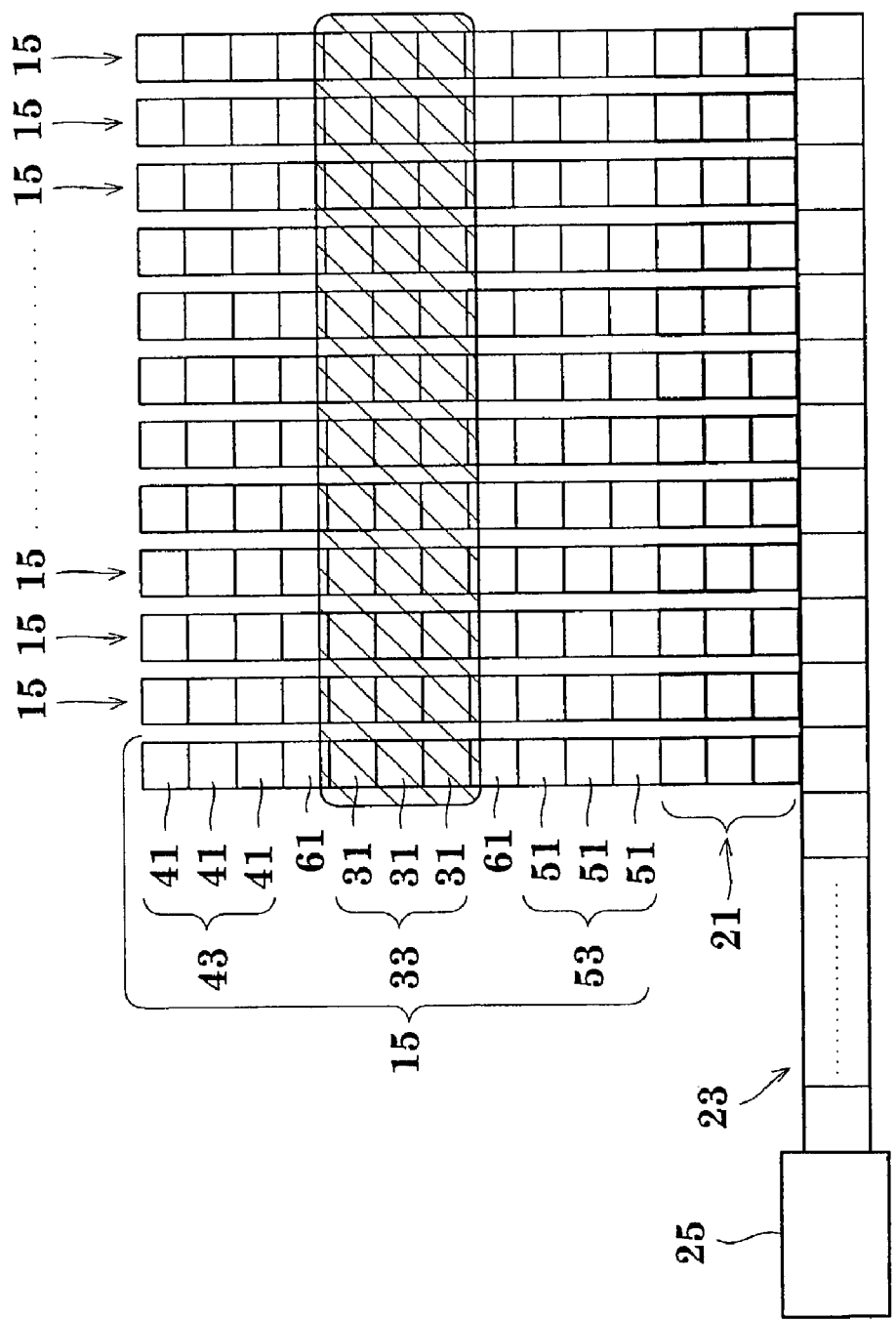
FIG. 10 is a schematic view showing a principal portion of an image sensor in a fourth embodiment.

An image pickup apparatus in a fourth embodiment of this invention will be described next. FIG. 10 is a schematic view showing a principal portion of an image sensor in the fourth embodiment. FIGS. 11A through 11D are views illustrating an integration of signal electrons of a corresponding phase in two storage units and photosensitive units.

The image pickup apparatus in the fourth embodiment includes a photosensitive unit 33 having a plurality of photosensitive pixels 31, a storage unit 43 having a plurality of storage pixels 41, and a storage unit 53 having a plurality of storage pixels 51. The storage unit 43 is disposed above the photosensitive unit 33, and the storage unit 53 below the photosensitive unit 33, to be opposed to each other across the photosensitive unit 33. Thus, signal electrons can move back and forth between the storage units 43 and 53 and the photosensitive unit 33, and the signal electrons are read after photography. That is, this image pickup apparatus may be said frame transfer type CCDs (Charge-Coupled Devices) with a storage unit having a plurality of storage pixels arranged below a photosensitive unit having a plurality of vertical transfer CCDs, and with a storage unit disposed also below the photosensitive unit, these components being modified into an in-situ storage image sensor to enable signal electrons to move back and forth between the storage units and photosensitive unit.

The image sensors 1 and image pickup apparatus in the first to third embodiments described hereinbefore are used primarily for continuously recording two-dimensional space images of a fast repetitive phenomenon with a slight quantity of signal light. The image sensor 1 and image pickup apparatus in the fourth embodiment may be used for measurement of a phenomenon not fast but similarly with a slight signal light. The image sensor 1 and image pickup apparatus in the fourth embodiment are useful where, for example, a target signal is slight compared with a background signal, and a lock-in measurement is carried out with an illuminating light modulated periodically. The lock-in measurement for use in measuring such a slight light may, for example, observe fluorescence by turning on and off laser light directed to an object (substance) under measurement, that is, may measure to determine a frequency of fluorescence obtained from the object under measurement when the object is excited by being irradiated with laser light. However, only a very slight fluorescence is obtained from the object under measurement when laser light is turned on to irradiate the object under measurement. Its slight signals are overwhelmed by stronger background signals due to disturbance light, an offset of a detector itself or the like. Then, by differentiating the signals acquired by turning on and off the laser light to irradiate the object (substance) under measurement, for example, the background signals may be canceled to obtain the target fluorescence, i.e. the slight signals. A characteristic distribution with a peak at a certain wavelength, for example, may be obtained on a coordinate system with the horizontal axis representing wavelength and the vertical axis intensity.

As shown in FIG. 10, the image sensor 1 in the fourth embodiment includes a plurality of (e.g. 12 in FIG. 10) unit pixels 15 juxtaposed sideways. Each unit pixel 15 has a photosensitive unit 33 having a plurality of (e.g. three in FIG. 10) photosensitive pixels 31, and storage units 43 and 53 each having a plurality of (e.g. three in FIG. 10) storage pixels 41 or 51. The storage units 43 and 53 are disposed above and below the photosensitive unit 33 to be opposed to each other across the photosensitive unit 33. The image sensor 1 further includes vertical transfer paths 21 communicating with the lower storage units 53, a horizontal transfer path 23 communicating with the vertical transfer paths 21, and an output amplifier 25. Dummy pixels 61 are arranged between the photosensitive units 33 and storage units 43 and 53. The dummy pixels 61 serve the purpose of preventing light intended for irradiating the photosensitive pixels 31 from turning around to and entering the storage pixels 41 and 51. As shown in FIG. 10, the fourth embodiment has eleven rows of pixels (including two rows of dummy pixels 61) arranged in the vertical direction, and twelve columns of unit pixels 15 arranged in the horizontal direction. This arrangement is variable and, for example, 100 rows of pixels may be arranged in the vertical direction and 1024 columns of unit pixels in the horizontal direction.

In the fourth embodiment, signal electrons move back and forth within the arrangement of the photosensitive unit 33 and two storage units 43 and 53 in each unit pixel 15 in the same cycle as the repetitive phenomenon of the object under measurement, i.e. synchronously with two on/off states of laser light. Signal electrons newly generated in the photosensitive pixels 31 of the photosensitive unit 33 are added, in the photosensitive unit 33, to the signal electrons already stored in the storage pixels 41 and 51 of the storage units 43 and 53.

In the fourth embodiment, the laser light is switched on and off every one millisecond, for example. During the first 10 microseconds after the switching (i.e. during the first 10 microseconds in the period of one millisecond), the signal electrons are moved between the photosensitive unit 33 and storage units 43 and 53. Thus, the moving time (10 microseconds) for moving the signal electrons through the photosensitive pixels 31 of the photosensitive unit 33 to the corresponding storage pixels 41 and 51 of the storage units 43 and 53 is sufficiently shorter than the exposure time (one millisecond). Even though the moving time of the signal electrons is included in the exposure time, the influence of the moving time is quantitatively negligible since the moving time is sufficiently shorter than the exposure time.

Specifically, as shown in FIG. 11A, the object under measurement is photographed during the exposure time $t_{on}$ (one millisecond) corresponding to the first half of the first cycle, when the laser light is turned on. Signal electrons are thereby generated in the photosensitive unit 33 by fluorescence signals and background signals. It is assumed that, at this time, the three photosensitive pixels 31 of the photosensitive unit 33 have, stored therein, signal electrons for frame "$F_{on}11$", frame "$F_{on}12$" and frame "$F_{on}13$" in order from the top.

As shown in FIG. 11B, in an exposure period $t_{off}$ (one millisecond) corresponding to the second half of the first cycle, when the laser light is turned off, the signal electrons having been generated in the photosensitive unit 33 are moved to the lower storage unit 53 during the 10 microseconds after start of the exposure period $t_{off}$. By photographing the object under measurement during this exposure time $t_{off}$ (one millisecond), signal electrons are generated in the photosensitive unit 33 only by background signals. At this time, the three photosensitive pixels 31 of the photosensitive unit 33 have, stored therein, signal electrons for frame "$F_{off}11$", frame "$F_{off}12$" and frame "$F_{off}13$" in order from the top, and the three storage pixels 51 of the lower storage unit 53 have, stored therein after being moved, the signal electrons for frame "$F_{on}11$", frame "$F_{on}12$" and frame "$F_{on}13$".

As shown in FIG. 11C, in an exposure period $t_{on}$ (one millisecond) corresponding to the first half of a next cycle, when the laser light is turned on, the signal electrons having been generated in the photosensitive unit 33 are moved to the upper storage unit 43, and the signal electrons generated in time of the laser light turned on and stored in the lower storage unit 53 are moved to the photosensitive unit 33, during the 10 microseconds after start of the exposure period $t_{on}$. By photographing the object under measurement during this exposure time $t_{on}$ (one millisecond), signal electrons are generated in the photosensitive unit 33 by fluorescence signals and background signals, and are integrated in the photosensitive unit 33 with the signal electrons generated in time of the laser light turned on and moved from the lower storage unit 53. At this time, the three storage pixels 41 of the upper storage unit 43 have, stored therein after being moved, the signal electrons for frame "$F_{off}11$", frame "$F_{off}12$" and frame "$F_{off}13$" in order from the top, and the three photosensitive pixels 31 of the photosensitive unit 33 have, stored therein, signal electrons for frame "$F_{on}11+F_{on}21$", frame "$F_{on}12+F_{on}22$" and frame "$F_{on}13+F_{on}23$" in order from the top.

As shown in FIG. 11D, in an exposure period $t_{off}$ (one millisecond) corresponding to the second half of the same cycle, when the laser light is turned off, the signal electrons having been integrated in the photosensitive unit 33 are moved to the lower storage unit 53, and the signal electrons generated in time of the laser light turned off and stored in the upper storage unit 43 are moved to the photosensitive unit 33, during the 10 microseconds after start of the exposure period $t_{off}$. By photographing the object under measurement during this exposure time $t_{off}$ (one millisecond), signal electrons are generated in the photosensitive unit 33 only by background signals, and are integrated in the photosensitive unit 33 with the signal electrons generated in time of the laser light turned off and moved from the upper storage unit 43. At this time, the three photosensitive pixels 31 of the photosensitive unit 33 have, stored therein, signal electrons for frame "$F_{off}11+F_{off}21$", frame "$F_{off}12+F_{off}22$" and frame "$F_{off}13+F_{off}23$" in order from the top, and the three storage pixels 51 of the lower storage unit 53 have, stored therein after being moved, the signal electrons for frame "$F_{on}11+F_{on}21$", frame "$F_{on}12+F_{on}22$" and frame "$F_{on}13+F_{on}23$" in order from the top.

The photographic operation is completed after photographing the phenomenon a predetermined number of times by turning on and off the laser light directed to the object. As a result, after the photographic operation, each side of the photosensitive unit 33 and storage units 43 and 53 stores, as integrated, signal electrons obtained during the periods corresponding the same phase, i.e. the periods when the laser light is turned on or off. Subsequently, as shown in FIG. 10, the signal electrons for two frames each stored in each side of the photosensitive unit 33 and storage units 43 and 53 are appropriately sent out to the vertical transfer path 21. The electrons are read through the vertical transfer path 21, horizontal transfer path 23 and output amplifier 25, and are converted by the analog-to-digital converter 27 to digital signals as a final output.

As described above, the image sensor 1 in the fourth embodiment differentiates the integrated images of the phase and time in which the laser light is turned on, and the integrated images of the phase and time in which the laser light is turned off. This realizes target signals of high signal-to-noise ratio.

Fifth Embodiment

Figure 12A:
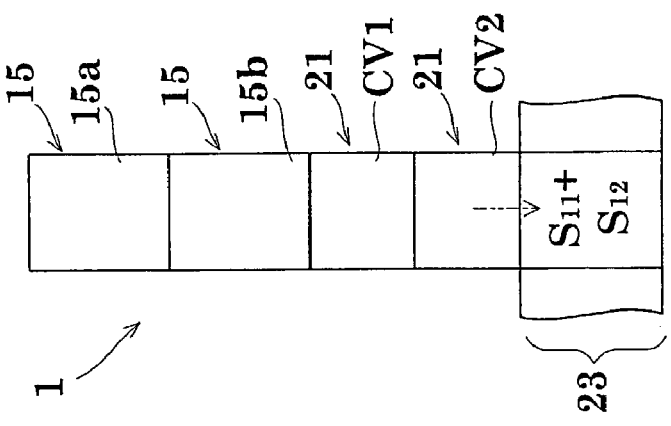
FIGS. 12A through 12C are views illustrating an integration, in a vertical transfer path, of signal electrons of a corresponding phase from storage pixels in different unit pixels.
Figure 12B:
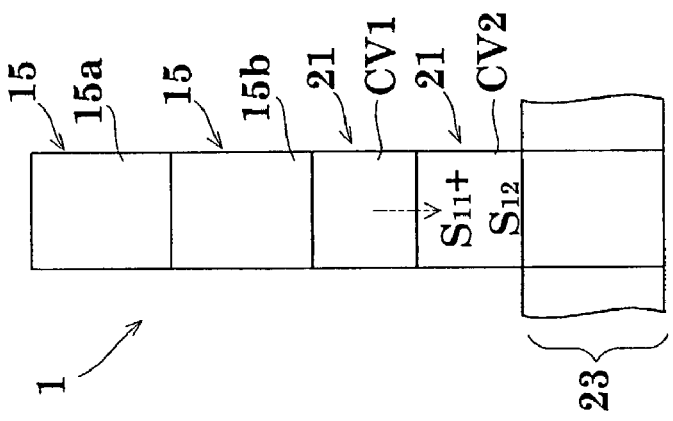
Figure 12C:
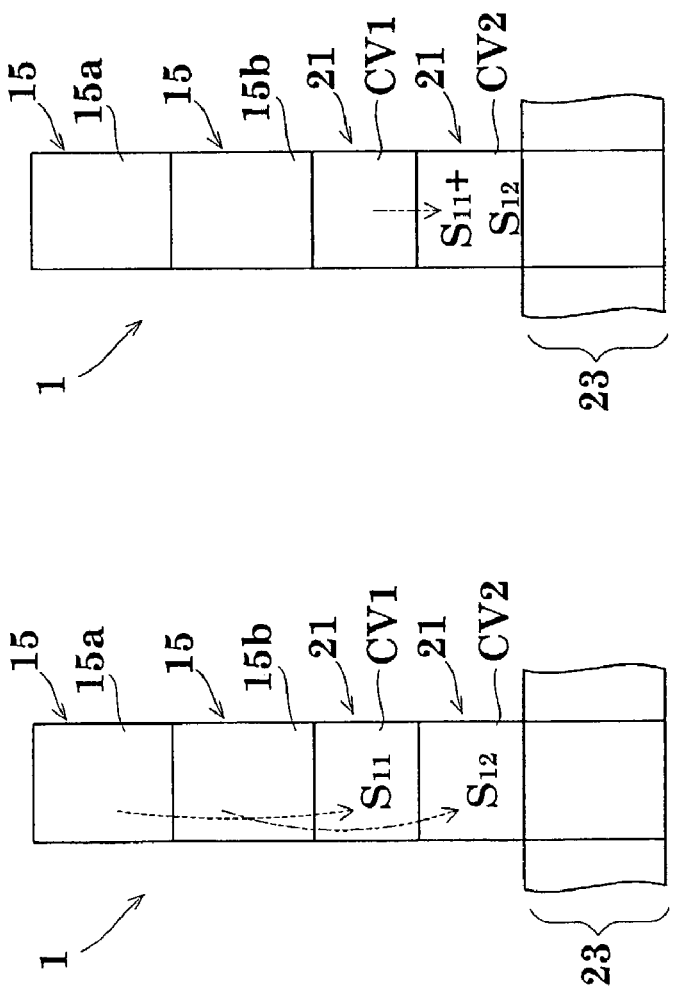

An image pickup apparatus in a fifth embodiment of this invention will be described next. FIGS. 12A through 12C are views illustrating an integration, in a vertical transfer path, of signal electrons of a corresponding phase from storage pixels in different unit pixels. After adding signal electrons in each unit pixel 15 as in the first embodiment described hereinbefore, the image pickup apparatus in the fifth embodiment integrates, in the vertical transfer path 21, signal electrons from storage pixels (e.g. storage pixels 13$a$-13$j$) for the same phase in different unit pixels 15 (i.e. a plurality of unit pixels 15 present in the same vertical transfer path 21). The other aspects are the same as in the first embodiment, and the fifth embodiment will be described in detail regarding the integration, in the vertical transfer path 21, of signal electrons from the corresponding storage pixels 13$a$-13$j$ in different unit pixels 15

As described in the first embodiment, the image sensor 1 in the fifth embodiment includes the vertical transfer paths 21 for vertically transferring the signal electrons stored in each unit pixel 15, the horizontal transfer path 23 for horizontally transferring the signal electrons transferred through the vertical transfer paths 21, and the output amplifier 25 for amplifying and outputting the signal electrons received from the horizontal transfer path 23.

The controller 7 shown in FIG. 2 has an additional function to carry out a transfer control for adding, in each vertical transfer path 21, signal electrons from the corresponding storage pixels 13$a$-13$j$ in a plurality of unit pixels 15 (e.g. two unit pixels for expediency of description).

The above control unit 7 corresponds to the transfer control device of this invention.

To facilitate understanding, the fifth embodiment will be described by exemplifying an operation, as shown in FIG. 12, for integrating, in the vertical transfer path 21, signal electrons from storage pixels 13$a$ in the two unit pixels 15 present in the same vertical transfer path 21.

As shown in FIG. 12A, two unit pixels 15 are present in the same vertical transfer path 21, i.e. an upper unit pixel 15 in FIG. 12 (which is a unit pixel 15 corresponding to an nth horizontal scanning line, and is referred to as a first unit pixel 15$a$ in the fifth embodiment), and a lower unit pixel 15 (which is a unit pixel 15 corresponding to a 1+nth horizontal scanning line, and is referred to as a second unit pixel 15$b$ in the fifth embodiment). Under control of the controller 7, signal electrons $S_{11}$ of the storage pixel 13$a$ in the first unit pixel 15$a$ and signal electrons $S_{21}$ of the storage pixel 13$a$ in the second unit pixel 15$b$ are individually transferred to cells CV1 and CV2 of the vertical transfer path 21, respectively.

Then, as shown in FIG. 12B, under control of the controller 7, the signal electrons $S_{11}$ of the storage pixel 13$a$ of the first unit pixel 15$a$ are transferred from the cell CV1 to the cell CV2 of the vertical transfer path 21. In this cell CV2, the signal electrons $S_{11}$ of the storage pixel 13$a$ of the first unit pixel 15$a$ are added to the signal electrons $S_{21}$ of the storage pixel 13$a$ of the second unit pixel 15$b$.

Subsequently, as shown in FIG. 12C, under control of the controller 7, the signal electrons $S_{11}+S_{21}$ stored in the cell CV2 are transferred to the horizontal transfer path 23. That is, the signal electrons resulting from the addition of the signal electrons $S_{11}$ and signal electrons $S_{21}$ of the storage pixels 13a of the two unit pixels 15 (first unit pixel 15a and second unit pixel 15b) are transferred to the horizontal transfer path 23.

A similar integrating operation may be carried out in the vertical transfer path 21 also for the storage pixels 13b-13j of the two unit pixels 15 present in the same vertical transfer path 21. An operation may be carried out to integrate, in the vertical transfer path 21, signal electrons in the corresponding storage pixels 13a-13j in more than two unit pixels 15 present in the same vertical transfer path 21.

With the image sensor 1 in the fifth embodiment, as described above, each vertical transfer path 21 vertically transfers the signal electrons stored in each unit pixel 15. The controller 7 carries out the transfer control for adding, in this vertical transfer path 21, the signal electrons of the corresponding storage pixels (e.g. storage pixels 13a-13j) in at least two of the plurality of unit pixels 15. Thus, signal electrons of the corresponding storage pixels (e.g. storage pixels 13a-13j) in different unit pixels 15 may be added. This realizes an increased degree of freedom in processing image signals acquired by the image sensor 1.

Sixth Embodiment

Figure 13A:
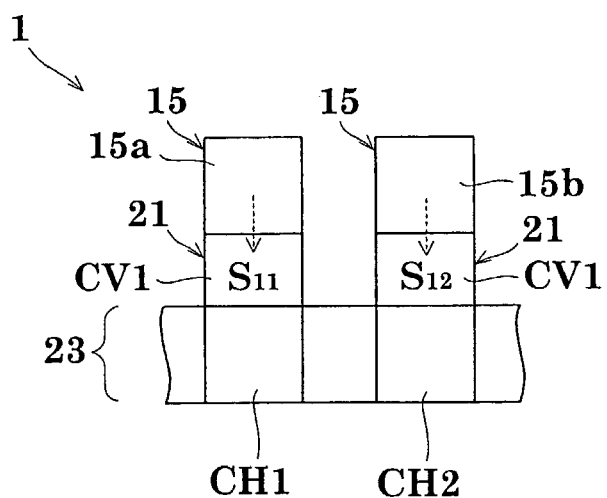
FIGS. 13A through 13C are views illustrating an integration, in a horizontal transfer path, of signal electrons of a corresponding phase from storage pixels in different unit pixels.
Figure 13B:
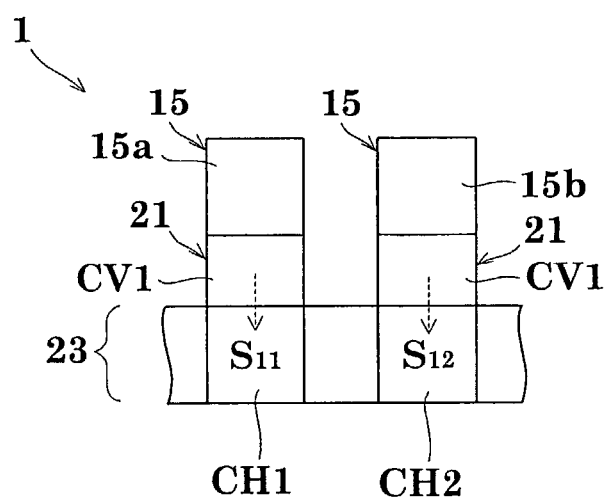
Figure 13C:
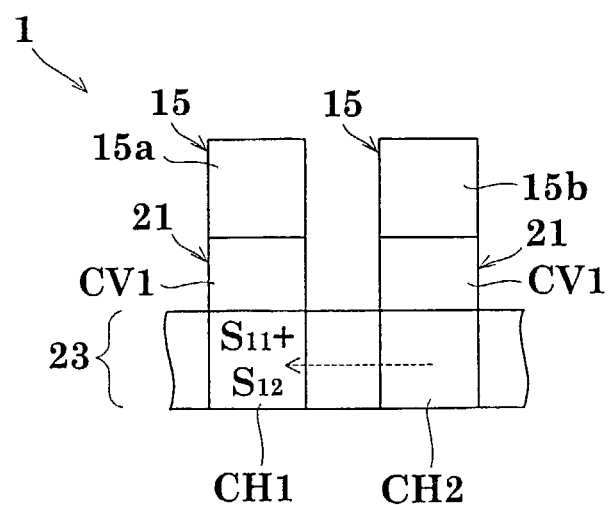

An image pickup apparatus in a sixth embodiment of this invention will be described next. FIGS. 13A through 13C are views illustrating an integration, in the horizontal transfer path, of signal electrons of a corresponding phase from storage pixels in different unit pixels. After adding signal electrons in each unit pixel 15 as in the first embodiment described hereinbefore, the image pickup apparatus in the sixth embodiment integrates, in the horizontal transfer path 23, signal electrons from storage pixels (e.g. storage pixels 13a-13j) for the same phase in different unit pixels 15 (i.e. a plurality of unit pixels 15 connected to the horizontal transfer path 23). The other aspects are the same as in the first embodiment, and the sixth embodiment will be described in detail regarding the integration, in the horizontal transfer path 23, of signal electrons from the corresponding storage pixels 13a-13j in different unit pixels 15

As described in the first embodiment, the image sensor 1 in the sixth embodiment includes the vertical transfer paths 21 for vertically transferring the signal electrons stored in each unit pixel 15, the horizontal transfer path 23 for horizontally transferring the signal electrons tranferred through the vertical transfer paths 21, and the output amplifier 25 for amplifying and outputting the signal electrons received from the horizontal transfer path 23.

The controller 7 shown in FIG. 2 has an additional function to carry out a transfer control for adding, in the horizontal vertical transfer path 23, signal electrons from the corresponding storage pixels 13a-13j in a plurality of unit pixels 15 (e.g. two unit pixels for expediency of description).

The above control unit 7 corresponds to the transfer control device of this invention.

To facilitate understanding, the sixth embodiment will be described by exemplifying an operation, as shown in FIG. 13, for integrating, in the horizontal transfer path 23, signal electrons from the storage pixels 13a in the two unit pixels 15 connected to the horizontal vertical transfer path 23.

As shown in FIG. 13A, two unit pixels 15 are connected to the horizontal transfer path 23, i.e. a lefthand unit pixel 15 in FIG. 13 (which is referred to as a first unit pixel 15a in the sixth embodiment), and a righthand unit pixel 15 (which is referred to as a second unit pixel 15b in the sixth embodiment). Under control of the controller 7, signal electrons $S_{11}$ of the storage pixel 13a in the first unit pixel 15a and signal electrons $S_{21}$ of the storage pixel 13a in the second unit pixel 15b are individually transferred to cells CV1 of the vertical transfer paths 21, respectively.

Then, as shown in FIG. 13B, under control of the controller 7, the signal electrons $S_{11}$ of storage pixel 13a of the first unit pixel 15a are transferred from the cell CV1 of the vertical transfer path 21 to a cell CH1 of the horizontal transfer path 23, and the signal electrons $S_{21}$ of storage pixel 13a of the second unit pixel 15b from the cell CV1 of the vertical transfer path 21 to a cell CH2 of the horizontal transfer path 23

Subsequently, as shown in FIG. 13C, under control of the controller 7, the signal electrons $S_{21}$ of storage pixel 13a of the second unit pixel 15b are transferred from the cell CH2 to the cell CH1 of the horizontal transfer path 23. In this cell CH1, the signal electrons $S_{11}$ of storage pixel 13a of the first unit pixel 15a and the signal electrons $S_{21}$ of storage pixel 13a of the second unit pixel 15b are added.

The signal electrons $S_{11}+S_{21}$ stored in the cell CH1 are transferred to the output amplifier 25 (FIG. 3). That is, the signal electrons resulting from the addition of the signal electrons $S_{11}$ and signal electrons $S_{21}$ of the storage pixels 13a of the two unit pixels 15 (first unit pixel 15a and second unit pixel 15b) are transferred to the output amplifier 25.

A similar integrating operation may be carried out in the horizontal transfer path 23 also for the storage pixels 13b-13j of the two unit pixels 15. An operation may be carried out to integrate, in the horizontal transfer path 23, signal electrons from the corresponding storage pixels 13a-13j in more than two unit pixels 15.

With the image sensor 1 in the sixth embodiment, as described above, the horizontal transfer path 23 horizontally transfers the signal electrons stored in each unit pixel 15. The controller 7 carries out the transfer control for adding, in this horizontal transfer path 23, the signal electrons from the corresponding storage pixels (e.g. storage pixels 13a-13j) in at least two of the plurality of unit pixels 15. Thus, signal electrons of the corresponding storage pixels (e.g. storage pixels 13a-13j) in different unit pixels 15 may be added. This realizes an increased degree of freedom in processing image signals acquired by the image sensor 1.

This invention is not limited to the foregoing embodiments, but may be modified as follows:

(1) In the second embodiment, as shown in FIG. 6, a plurality of storage pixels 13a-13e are arranged linearly. Instead, the storage pixels may be arranged in a curve or a multiangular line.

(2) The fourth embodiment acquires data for two frames with the laser light turned on and off. Data for a further plurality of frames may be acquired by equally increasing the number of the storage pixels 41 and 51 in the upper and lower storage units 43 and 53. Where, for example, nine storage pixels 41 and 51 are formed in each of the upper and lower storage units 43 and 53, these storage units 43 and 53 can store data for three frames. Consequently, data for four frames may be acquired in combination with the date for one frame stored in the photosensitive unit 33.

(3) The fifth embodiment adds signal electrons of a plurality of unit pixels arranged vertically. The sixth embodiment adds signal electrons of a plurality of unit pixels arranged horizontally. Instead, an addition may be made for a plurality of unit pixels arranged vertically and horizontally. This may be implemented by using the adding methods of the fifth and sixth embodiments.

(4) The fifth and sixth embodiments add signal electrons from the storage pixels of a corresponding phase in a plurality of unit pixels. Instead, signal electrons from storage pixels of different phases in a plurality of unit pixels may be added. This may be implemented by a transfer control of the controller 7 to add, in at least one of the vertical transfer path 21 and horizontal transfer path 23, signal electrons from storage pixels for one photographing time in a predetermined number of unit pixels, and signal electrons of storage pixels for a different corresponding photography time in the remaining unit pixels. That is, for adding signal electrons of the storage pixels for different phases in a plurality of unit pixels arranged in at least one of the vertical direction and the horizontal direction, the adding methods of the fifth and sixth embodiments may be modified.

Figure 14A:
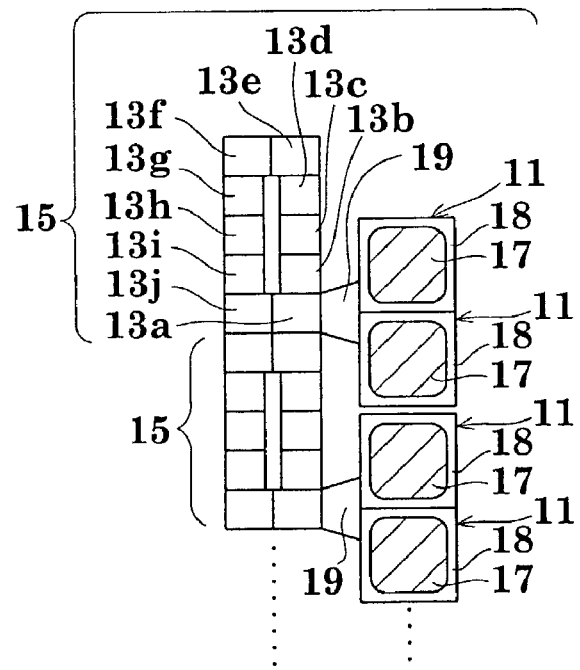
FIGS. 14A and 14B are views illustrating unit pixels each having a plurality of photosensitive pixels and a plurality of storage pixels.
Figure 14B:
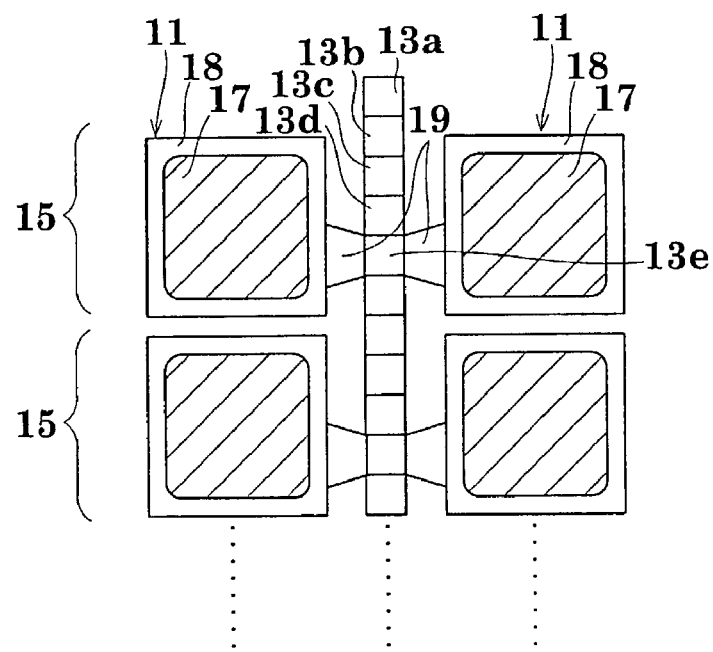

(5) In the first and second embodiments, as shown in FIGS. 3 and 6, each unit pixel 15 is formed of a single photosensitive pixel 11 and a plurality of storage pixels 13a-13e. As shown in FIGS. 14A and 14B, each unit pixel 15 may include a plurality of (e.g. two) photosensitive pixels 11 and a plurality of storage pixels 13a-13e, the plurality of photosensitive pixels 11 being in communication with one of the storage pixels 13a. Then, for example, signal electrons generated in two photosensitive pixels 11 may be added in one storage pixel 13a. Further, an optical filter of a first transmission wavelength may be provided for one photosensitive pixel 11, and an optical filter of a different, second transmission wavelength for the other photosensitive pixel 11, thereby to obtain image signals each combining an image signal of one transmission wavelength and an image signal of the other transmission wavelength. That is, signal electrons generated in the plurality of photosensitive pixels 11 in each unit pixel 15 may be added in one storage pixel 13a in that unit pixel 15, and the two photosensitive pixels 11 may receive lights of different wavelengths, thereby to increase the degree of freedom for various processes of image signals.

This invention may be embodied in other specific forms without departing from the spirit or essential attributes thereof and, accordingly, reference should be made to the appended claims, rather than to the foregoing specification, as indicating the scope of the invention.

What is claimed is:

1. An image sensor for converting optical images to electric outputs, comprising:
    a plurality of unit pixels each including a photosensitive pixel for performing a photoelectric conversion of incident light, and a plurality of storage pixels for storing, on a frame-by-frame basis, signal electrons generated in said photosensitive pixel for a plurality of frames photographed at different times, said image sensor outputting the signal electrons from said storage pixels after a photographing operation;
    wherein said storage pixels within each of said unit pixels are arranged successively, or arranged with said photosensitive pixel disposed between certain of said storage pixels, so that the signal electrons for each said storage pixel are moved independently through said storage pixels; and
    signal electrons newly generated during a frame in said photosensitive pixel within each of said unit pixels are added to relevant signal electrons which generated during a different frame among the signal electrons moved independently through said storage pixels within said unit pixel.

2. An image sensor as defined in claim 1, wherein:
    said storage pixels within each of said unit pixels are arranged linearly or annularly in succession, or arranged linearly or annularly with said photosensitive pixel disposed between certain of said storage pixels, so that the signal electrons for each said storage pixel are moved independently and cyclically or back and forth through said storage pixels; and
    said signal electrons newly generated in said photosensitive pixel within each of said unit pixels are added, in said unit pixel, to relevant signal electrons among the signal electrons moved independently and cyclically or back and forth through said storage pixels within said unit pixel.

3. An image sensor as defined in claim 2, further comprising:
    transfer means for transferring the signal electrons in a predetermined direction from each of said unit pixels; and
    amplifying and output means for amplifying and outputting the signal electrons transferred by said transfer means.

4. An image sensor as defined in claim 1, further comprising:
    transfer means for transferring the signal electrons in a predetermined direction from each of said unit pixels; and
    transfer control means for performing a transfer control to add, in said transfer means, the signal electrons from corresponding storage pixels in at least two of said plurality of unit pixels.

5. An image sensor as defined in claim 4, wherein:
    said transfer means includes vertical transfer means for vertically transferring the signal electrons from each of said unit pixels, and horizontal transfer means for horizontally transferring the signal electrons received from said vertical transfer means; and
    said transfer control means is arranged to perform the transfer control to add, in at least one of said vertical transfer means and said horizontal transfer means, the signal electrons from the corresponding storage pixels in at least two of said plurality of unit pixels.

6. An image sensor as defined in claim 5, wherein said transfer control means is arranged to perform the transfer control to add, in at least one of said vertical transfer means and said horizontal transfer means, the signal electrons from those of the storage pixels corresponding in photographing time in at least two of said plurality of unit pixels.

7. An image sensor as defined in claim 5, wherein said transfer control means is arranged to perform the transfer control to add, in at least one of said vertical transfer means and said horizontal transfer means, signal electrons of storage pixels for one photographing time in a predetermined number of unit pixels, and signal electrons of storage pixels for a different corresponding photography time in the remaining unit pixels.

8. An image sensor as defined in claim 2, further comprising;
    transfer means for transferring the signal electrons in a predetermined direction from each of said unit pixels; and
    transfer control means for performing a transfer control to add, in said transfer means, the signal electrons from corresponding storage pixels in a predetermined number of unit pixels.

9. An image sensor as defined in claim 8, wherein:
    said transfer means includes vertical transfer means for vertically transferring the signal electrons from each of said unit pixels, and horizontal transfer means for horizontally transferring the signal electrons received from said vertical transfer means; and said transfer control means is arranged to perform the transfer control to add, in at least one of said vertical transfer means and said horizontal transfer means, the signal electrons from the corresponding storage pixels in at least two of said plurality of unit pixels.

10. An image sensor as defined in claim 9, wherein said transfer control means is arranged to perform the transfer control to add, in at least one of said vertical transfer means and said horizontal transfer means, the signal electrons from those of the storage pixels corresponding in photographing time in said plurality of unit pixels.

11. An image sensor as defined in claim 9, wherein said transfer control means is arranged to perform the transfer control to add, in at least one of said vertical transfer means and said horizontal transfer means, signal electrons of storage pixels for one photographing time in a predetermined number of unit pixels, and signal electrons of storage pixels for a different corresponding photography time in the remaining unit pixels.

12. An image sensor for converting optical images to electric outputs, comprising:

a plurality of unit pixels each including a plurality of photosensitive pixels for performing a photoelectric conversion of incident light, and a plurality of storage pixels for storing, on a frame-by-frame basis, signal electrons generated in said photosensitive pixels for a plurality of frames photographed at different times, said image sensor outputting the signal electrons from said storage pixels after a photographing operation;

wherein said storage pixels within each of said unit pixels are arranged successively, with said plurality of photosensitive pixels connected to one of said storage pixels, so that the signal electrons for each said storage pixel are moved independently through said storage pixels; and signal electrons newly generated during a frame in said photosensitive pixels within each of said unit pixels are added to relevant signal electrons which generated during a different frame among the signal electrons moved independently through said storage pixels within said unit pixel.

13. An image sensor as defined in claim 12, further comprising:

transfer means for transferring the signal electrons in a predetermined direction from each of said unit pixels; and amplifying and output means for amplifying and outputting the signal electrons transferred by said transfer means.

14. An image sensor as defined in claim 1, wherein said photosensitive pixel has a shielding film for covering peripheral edges thereof.

15. An image sensor as defined in claim 2, wherein said photosensitive pixel has a shielding film for covering peripheral edges thereof.

16. An image sensor as defined in claim 4, wherein said photosensitive pixel has a shielding film for covering peripheral edges thereof.

17. An image pickup apparatus, having an image sensor as defined in claim 1, for photographing a photographic subject, said apparatus comprising:

periodic signal creating means for creating a periodic signal concerning a repetitive phenomenon of the photographic subject;

clock signal generating means for generating a clock signal by multiplying the periodic signal from said periodic signal creating means by the number of said storage pixels; and control means for controlling each of said unit pixels, based on the clock signal from said clock signal generating means, to integrate into the same storage pixel the signal electrons generated each time the repetitive phenomenon is in a corresponding phase.

18. An image pickup apparatus, having an image sensor as defined in claim 2, for photographing a photographic subject, said apparatus comprising:

periodic signal creating means for creating a periodic signal concerning a repetitive phenomenon of the photographic subject;

clock signal generating means for generating a clock signal by multiplying the periodic signal from said periodic signal creating means by the number of said storage pixels; and control means for controlling each of said unit pixels, based on the clock signal from said clock signal generating means, to integrate into the same storage pixel the signal electrons generated each time the repetitive phenomenon is in a corresponding phase.

19. An image pickup apparatus, having an image sensor as defined in claim 3, for photographing a photographic subject, said apparatus comprising:

periodic signal creating means for creating a periodic signal concerning a repetitive phenomenon of the photographic subject;

clock signal generating means for generating a clock signal by multiplying the periodic signal from said periodic signal creating means by the number of said storage pixels; and control means for controlling each of said unit pixels, based on the clock signal from said clock signal generating means, to integrate into the same storage pixel the signal electrons generated each time the repetitive phenomenon is in a corresponding phase.

20. An image pickup apparatus, having an image sensor as defined in claim 12, for photographing a photographic subject, said apparatus comprising:

periodic signal creating means for creating a periodic signal concerning a repetitive phenomenon of the photographic subject;

clock signal generating means for generating a clock signal by multiplying the periodic signal from said periodic signal creating means by the number of said storage pixels; and control means for controlling each of said unit pixels, based on the clock signal from said clock signal generating means, to integrate into the same storage pixel the signal electrons generated each time the repetitive phenomenon is in a corresponding phase.

* * * * *